United States Patent
Uchida et al.

(10) Patent No.: US 11,898,016 B2
(45) Date of Patent: Feb. 13, 2024

(54) MASTER BATCH, POLYCARBONATE RESIN COMPOSITION, INJECTION FOAM MOLDED BODY AND METHOD FOR PRODUCING SAME

(71) Applicant: KANEKA CORPORATION, Osaka (JP)

(72) Inventors: Soichi Uchida, Osaka (JP); Kazunori Saegusa, Osaka (JP); Mitsutaka Sato, Hyogo (JP)

(73) Assignee: KANEKA CORPORATION, Osaka (JP)

( * ) Notice: Subject to any disclaimer, the term of this patent is extended or adjusted under 35 U.S.C. 154(b) by 777 days.

(21) Appl. No.: 17/079,388

(22) Filed: Oct. 23, 2020

(65) Prior Publication Data
US 2021/0047481 A1 Feb. 18, 2021

Related U.S. Application Data

(63) Continuation of application No. PCT/JP2019/017484, filed on Apr. 24, 2019.

(30) Foreign Application Priority Data

Apr. 27, 2018 (JP) .................................. 2018-087159

(51) Int. Cl.
| | | |
|---|---|---|
| C08J 3/22 | (2006.01) | |
| B29C 45/00 | (2006.01) | |
| B29C 45/14 | (2006.01) | |
| C08J 9/00 | (2006.01) | |
| C08J 9/228 | (2006.01) | |
| C08L 69/00 | (2006.01) | |
| C08L 101/00 | (2006.01) | |

(52) U.S. Cl.
CPC ............. *C08J 3/22* (2013.01); *B29C 45/0001* (2013.01); *B29C 45/14795* (2013.01); *C08J 9/0061* (2013.01); *C08J 9/228* (2013.01); *C08L 69/00* (2013.01); *C08L 101/00* (2013.01); *C08J 2203/22* (2013.01); *C08J 2333/08* (2013.01); *C08J 2333/10* (2013.01); *C08J 2369/00* (2013.01); *C08L 2203/14* (2013.01); *C08L 2205/03* (2013.01); *C08L 2207/53* (2013.01)

(58) Field of Classification Search
CPC ... C08J 4/22; C08J 9/0061; C08J 9/228; C08J 2203/22; C08J 2333/08; C08J 2333/10; C08J 2369/00; B29C 45/0001; B29C 45/14795; C08L 60/00; C08L 101/00; C08L 2203/14; C08L 2205/03; C08L 2207/53

See application file for complete search history.

(56) References Cited

U.S. PATENT DOCUMENTS

| | | |
|---|---|---|
| 2011/0166242 A1 | 7/2011 | Kawaguchi et al. |
| 2019/0031851 A1 | 1/2019 | Uchida |

FOREIGN PATENT DOCUMENTS

| | | |
|---|---|---|
| EP | 2336226 A1 | 6/2011 |
| EP | 3438176 A1 | 2/2019 |
| JP | 2007-231080 A | 9/2007 |
| JP | 2010-222407 A | 10/2010 |
| JP | 2012-140608 A | 7/2012 |
| JP | 2013-142146 A | 7/2013 |
| JP | 2014-070198 A | 4/2014 |
| JP | 2015-151461 A | 8/2015 |
| JP | 2017-082244 A | 5/2017 |
| WO | 2016/076209 A1 | 5/2016 |
| WO | 2017/171031 A1 | 10/2017 |

OTHER PUBLICATIONS

International Search Report issued in International Application No. PCT/JP2019/017484, dated Jul. 30, 2019 (1 page).
Written Opinion issued in International Application No. PCT/JP2019/017484, dated Jul. 30, 2019 (3 pages).
Extended European Seach Report issued in European Patent Application No. 19794050.5, dated Jan. 10, 2022 (14 pages).

*Primary Examiner* — Edward J Cain
(74) *Attorney, Agent, or Firm* — Osha Bergman Watanabe & Burton LLP

(57) ABSTRACT

A masterbatch (C) containing thermally expandable microcapsules (A) and a carrier resin composition (B) is provided. The carrier resin composition (B) contains a carrier resin (B1) and a plasticizer (B2), the carrier resin (B1) being an acrylic resin having a weight average molecular weight of 8,000 or more and 350,000 or less, and the plasticizer (B2) being an acrylic plasticizer having a weight average molecular weight of 1,000 or more and 20,000 or less. The carrier resin composition (B) is substantially compatible with a polycarbonate resin and has a shear viscosity of 1.0 Pa·s or more and $1.5 \times 10^6$ Pa·s or less at 80° C. The occurrence of whitening is suppressed and a good appearance can be obtained in an injection molded foam made with the masterbatch. A polycarbonate resin composition, an injection molded foam, and a method for producing an injection molded foam are provided.

18 Claims, 1 Drawing Sheet

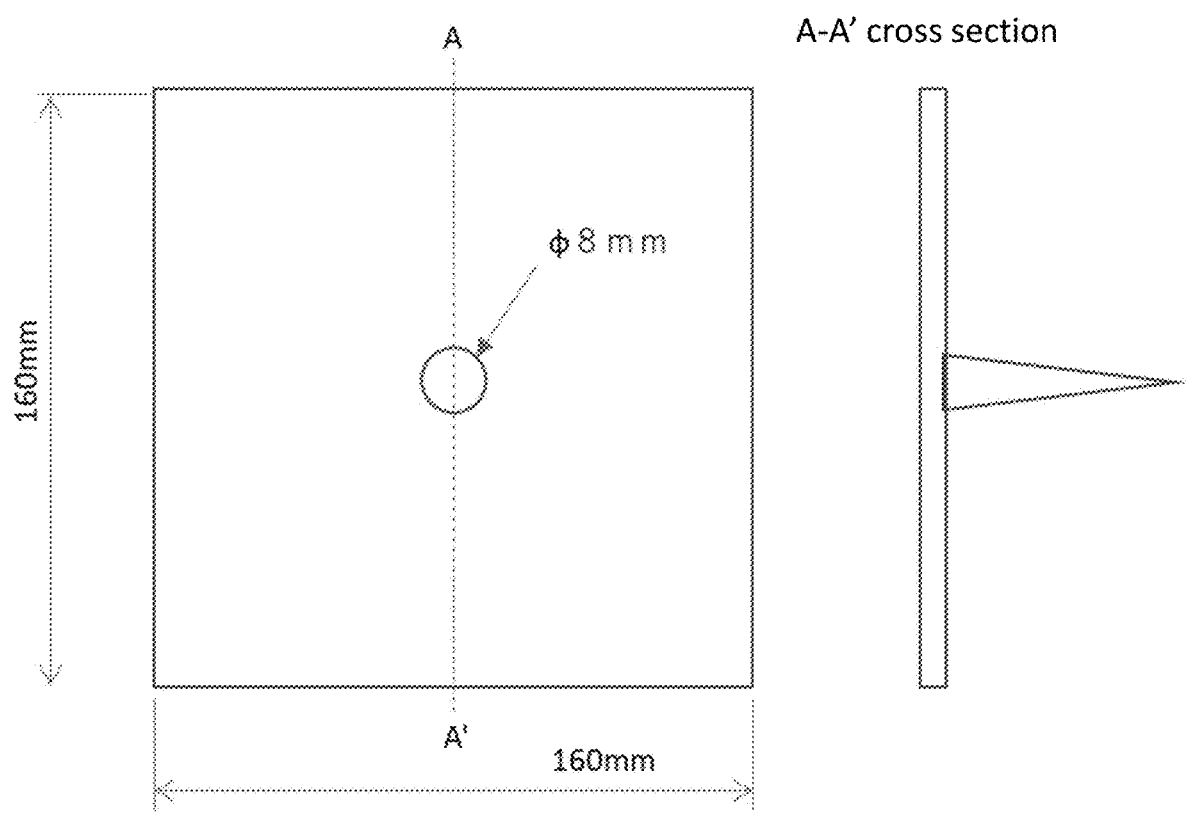

MASTER BATCH, POLYCARBONATE RESIN COMPOSITION, INJECTION FOAM MOLDED BODY AND METHOD FOR PRODUCING SAME

TECHNICAL FIELD

One or more embodiments of the present invention relate to a masterbatch of thermally expandable microcapsules with which an injection molded foam of a polycarbonate resin composition having a good appearance can be obtained, a polycarbonate resin composition, an injection molded foam, and a method for producing an injection molded foam.

BACKGROUND

In foam injection molding of resins, many thermally degradable chemical blowing agents, such as sodium bicarbonate, are used. Moreover, thermally expandable microcapsules capable of expanding and foaming when heated are also used in foam injection molding of resins. Usually, from the viewpoint of dispersibility in a base material resin and workability, a masterbatch in which a thermoplastic resin or a thermoplastic elastomer contains a chemical blowing agent or thermally expandable microcapsules in an amount of 20 to 60 wt % is often used. For example, Patent Document 1 discloses a blowing agent masterbatch mainly composed of an ethylene/α-olefin copolymer and a thermally degradable blowing agent. Also, Patent Document 2 discloses a masterbatch that contains thermally expandable microcapsules, a carrier resin containing an olefin polymer, and a lubricant.

For foam injection molding of resins, physical foaming may also be employed, which is a process of directly impregnating a molten resin in a cylinder of an injection molding machine with a supercritical fluid, such as carbon dioxide or nitrogen, and thereby foaming the resin. For example, Patent Document 3 discloses production of a molded foam by melt-kneading a resin composition having a sea-island structure in an injection forming machine, the resin composition being obtained by kneading a resin (A) that forms a sea phase and a resin (B) that forms an island layer, then injecting a supercritical fluid into the resin composition in a molten state, and thereby performing injection forming.

Patent Document 1: JP 2013-142146A
Patent Document 2: JP 2017-082244A
Patent Document 3: JP 2015-151461A However, when the blowing agent masterbatch disclosed in Patent Document 1 is used to foam a polycarbonate resin, the thermally degradable blowing agent such as sodium bicarbonate generates water and a metal component during gas production, and therefore, there is a problem in that hydrolysis of the polycarbonate resin is promoted, and whitening due to low molecular weight molecules generated by the hydrolysis occurs on the surface of the injection molded foam, resulting in a poor appearance. When the masterbatch of thermally expandable microcapsules disclosed in Patent Document 2 is used to foam a polycarbonate resin, since the carrier resin contains the olefin polymer, there is a problem in that whitening caused by an olefin-based incompatible component occurs on the surface of the injection molded foam, resulting in a poor appearance. When a physical foaming process such as that disclosed in Patent Document 3 is used to foam a polycarbonate resin, there is a problem in that whitening caused by the impregnating gas occurs, resulting in a poor appearance.

In order to address the above-described conventional problems, one or more embodiments of the present invention provide a masterbatch of thermally expandable microcapsules with which an injection molded foam of a polycarbonate resin composition in which the occurrence of whitening is suppressed and which has a good appearance can be obtained, a polycarbonate resin composition, an injection molded foam, and a method for producing an injection molded foam.

SUMMARY

One or more embodiments of the present invention relate to a masterbatch (C) containing thermally expandable microcapsules (A) and a carrier resin composition (B), wherein the carrier resin composition (B) contains a carrier resin (B1) and a plasticizer (B2), the carrier resin (B1) being an acrylic resin having a weight average molecular weight of 8,000 or more and 350,000 or less and being a solid at 20° C., and the plasticizer (B2) being a liquid at 20° C. and having a weight average molecular weight of 1,000 or more and 20,000 or less, and the carrier resin composition (B) is substantially compatible with a polycarbonate resin and has a shear viscosity of 1.0 Pa·s or more and $1.5 \times 10^6$ Pa·s or less at 80° C.

The masterbatch (C) can be suitably used for a polycarbonate resin. The polycarbonate resin may further contain at least one other thermoplastic resin selected from the group consisting of a polyester resin, a polyester-polyether copolymer, an acrylonitrile-butadiene-styrene copolymer, an acrylonitrile-ethylene-propylene-diene-styrene copolymer, an acrylate-styrene-acrylonitrile copolymer, an acrylonitrile-styrene copolymer, a polyarylate resin, a polystyrene resin, and a polyamide resin.

It may be possible that the plasticizer (B2) is an acrylic plasticizer. It may be possible that the carrier resin (B1) has a glass transition temperature (Tg) of −30° C. or more and 150° C. or less.

The thermally expandable microcapsules (A) may have a core-shell structure and are constituted by a core that is composed of at least one compound having a boiling point of 10° C. or more and 330° C. or less and a shell that encloses the core, and the shell may be composed of a resin having a constitutional unit derived from at least one monomer selected from the group consisting of a nitrile monomer, a (meth)acrylate monomer, an aromatic vinyl monomer, a diene monomer, a vinyl monomer having a carboxyl group, and a monomer having at least one reactive functional group selected from the group consisting of a methylol group, a hydroxyl group, an amino group, an epoxy group, and an isocyanate group.

It may be possible that the thermally expandable microcapsules (A) have a maximum expansion temperature of 180° C. or more and 300° C. or less.

It may be possible that, in the resin forming the shell, a constitutional unit derived from at least one monomer selected from the group consisting of a monomer containing a carboxyl group and a monomer containing an amino group is contained in a concentration of 12 mmol/g or less.

It may be possible that the thermally expandable microcapsules (A) have an average particle size of 0.5 μm or more and 50 μm or less.

It may be possible that the carrier resin (B1) is an acrylic resin containing acrylic resin particles (a) having an average particle size of 50 μm or more and 500 μm or less and acrylic resin particles (b) having an average particle size of 0.05 μm or more and 0.5 μm or less with which the acrylic resin particles (a) are coated.

It may be possible that the acrylic resin particles (a) are composed of a (meth)acrylic acid ester in an amount of 30 to 100 wt % and a vinyl monomer copolymerizable with the (meth)acrylic acid ester in an amount of 0 to 70 wt %.

It may be possible that the acrylic resin particles (b) are composed of a (meth)acrylic acid ester in an amount of 30 to 100 wt % and a vinyl monomer copolymerizable with the (meth)acrylic acid ester in an amount of 0 to 70 wt %.

It may be possible that the acrylic resin particles (b) are polymer particles obtained by polymerization of 50 to 90 parts by weight of latex particles (b1) containing a (meth)acrylic acid ester in an amount of 50 to 100 wt %, an aromatic vinyl monomer in an amount of 0 to 40 wt %, a vinyl monomer copolymerizable with the (meth)acrylic acid ester and the aromatic vinyl monomer in an amount of 0 to 10 wt %, and a multifunctional monomer in an amount of 0 to 5 wt % with 10 to 50 parts by weight of a monomer mixture (b2) containing a (meth)acrylic acid ester in an amount of 10 to 100 wt %, an aromatic vinyl monomer in an amount of 0 to 90 wt %, a vinyl cyanate monomer in an amount of 0 to 25 wt %, and a vinyl monomer copolymerizable with the (meth)acrylic acid ester, the aromatic vinyl monomer, and the vinyl cyanate monomer in an amount of 0 to 20 wt %, and a total amount of the latex particles (b1) and the monomer mixture (b2) is 100 parts by weight.

It may be possible that the masterbatch (C) contains the thermally expandable microcapsules (A) in an amount of 30 wt % or more and 80 wt % or less, the carrier resin (B1) in an amount of 15 wt % or more and 65 wt % or less, and the plasticizer (B2) in an amount of 5 wt % or more and 30 wt % or less, and the amount of the carrier resin (B1) is larger than the amount of the plasticizer (B2).

One or more embodiments of the present invention also relate to a polycarbonate resin composition containing the masterbatch in an amount of 1 to 15 wt %, a polycarbonate resin in an amount of 30 to 99 wt %, and at least one other thermoplastic resin selected from the group consisting of a polyester resin, a polyester-polyether copolymer, an acrylonitrile-butadiene-styrene copolymer, an acrylonitrile-ethylene-propylene-diene-styrene copolymer, an acrylate-styrene-acrylonitrile copolymer, an acrylonitrile-styrene copolymer, a polyarylate resin, a polystyrene resin, and a polyamide resin in an amount of 0 to 55 wt %.

The polycarbonate resin composition may further contain an inorganic compound.

One or more embodiments of the present invention also relate to an injection molded foam that is obtained through foam injection molding of the polycarbonate resin composition.

One or more embodiments of the present invention also relate to a method for producing an injection molded foam, the method including supplying the polycarbonate resin composition to an injection molding machine, and moving a core of a mold backward after filling to an initial fill thickness has been completed.

With one or more embodiments of the present invention, it is possible to provide a masterbatch of thermally expandable microcapsules with which an injection molded foam of a polycarbonate resin composition in which the occurrence of whitening is suppressed and which has a good appearance can be obtained, as well as a polycarbonate resin composition. Also, with one or more embodiments of the present invention, it is possible to obtain an injection molded foam of a polycarbonate resin composition in which the occurrence of whitening is suppressed and which has a good appearance.

BRIEF DESCRIPTION OF DRAWINGS

FIG. 1 is an explanatory diagram regarding a cavity of a mold used to produce an injection molded foam.

DETAILED DESCRIPTION

Hereinafter, one or more embodiments of the present invention will be described. Note that one or more embodiments of the present invention are not limited to the embodiments described below.

<Thermally Expandable Microcapsules (A)>

First, thermally expandable microcapsules (A) used in one or more embodiments of the present invention will be described in detail. The thermally expandable microcapsules (A) refer to a blowing agent in the form of capsules in which a low-boiling-point compound in liquid form is enclosed in a shell of a thermoplastic polymer and when heated in a cylinder of an injection molding machine, the low-boiling-point compound vaporizes, and the capsules expanded by the pressure applied by the vaporized compound function as the blowing agent. For example, thermally expandable microcapsules disclosed in JP 2011-16884A may be suitably used as the thermally expandable microcapsules (A). Specifically the thermally expandable microcapsules (A) have a core-shell structure, and the core is composed of at least one compound having a boiling point of 10° C. or more and 330° C. or less, while the shell encloses the core and is composed of a thermoplastic resin.

The core can be composed of at least one compound selected from compounds having a boiling point of 10° C. or more and 330° C. or more. There is no particular limitation on the compound forming the core, and examples thereof include hydrocarbons, alcohols, ketones, and the like. There is no particular limitation on the hydrocarbons, and examples thereof include pentane, hexane, heptane, octane, nonane, decane, undecane, dodecane, tridecane, tetradecane, pentadecane, hexadecane, heptadecane, octadecane, nonadecane, eicosane, structural isomers of these hydrocarbons, and the like. The compound forming the core may be at least one hydrocarbon having a boiling point of 10° C. or more and 330° C. or less, at least one hydrocarbon having a boiling point of 30° C. or more and 280° C. or less, or at least one hydrocarbon having a boiling point of 30° C. or more and 200° C. or less. When a compound having a boiling point of 10° C. or more is used, it is easy to form the thermally expandable microcapsules (A) into a masterbatch. Also, when a compound having a boiling point of 330° C. or less is used, the dispersibility during polymerization is favorable, and it is easy to produce thermally expandable microcapsules.

As a monomer component of the thermoplastic resin forming the shell of the thermally expandable microcapsules (A), for example, it is possible to use at least one monomer selected from the group consisting of a nitrile monomer, a (meth)acrylate monomer, an aromatic vinyl monomer, a diene monomer, a vinyl monomer having a carboxyl group, as well as a monomer having at least one reactive functional group selected from the group consisting of a methylol group, a hydroxyl group, an amino group, an epoxy group, and an isocyanate group.

Examples of the nitrile monomer include acrylonitrile, methacrylonitrile, α-chloroacrylonitrile, α-ethoxyacrylonitrile, fumaronitrile, and the like.

Examples of the (meth)acrylate monomer include methyl (meth)acrylate, ethyl (meth)acrylate, n-butyl (meth)acrylate, isobutyl (meth)acrylate, t-butyl (meth)acrylate, 2-ethylhexyl (meth)acrylate, stearyl (meth)acrylate, lauryl (meth)acrylate, phenyl (meth)acrylate, isobornyl (meth)acrylate, cyclohexyl (meth)acrylate, benzyl (meth)acrylate, and the like. In the present disclosure, "(meth)acrylate" may refer to methacrylate or acrylate.

Examples of the aromatic vinyl monomer include styrene, α-methyl styrene, vinyltoluene, t-butyl styrene, p-nitrostyrene, chloromethylstyrene, and the like.

Examples of the diene monomer include butadiene, isoprene, chloroprene, and the like.

Examples of the vinyl monomer having a carboxyl group include unsaturated monocarboxylic acids, such as acrylic acid, methacrylic acid, ethacrylic acid, crotonic acid, and cinnamic acid; unsaturated dicarboxylic acids, such as maleic acid, itaconic acid, fumaric acid, citraconic acid, and chloromaleic acid; their anhydrides; unsaturated dicarboxylic acid monoesters, such as monomethyl maleate, monoethyl maleate, monobutyl maleate, monomethyl fumarate, monoethyl fumarate, monomethyl itaconate, monoethyl itaconate, and monobutyl itaconate; and the like.

Examples of the monomer having at least one reactive functional group selected from the group consisting of a methylol group, a hydroxyl group, an amino group, an epoxy group, and an isocyanate group (hereinafter also referred to simply as the "monomer having a reactive functional group") include N-methylol (meth)acrylamide, N,N-dimethylaminoethyl(meth)acrylate, N,N-dimethylaminopropyl (meth)acrylate, vinyl glycidyl ether, propenyl glycidyl ether glycidyl (meth)acrylate, glycerin mono(meth)acrylate, 4-hydroxybutyl (meth)acrylate, 2-hydroxy-3-phenoxypropyl (meth)acrylate, p-hydroxystyrene, a blocked isocyanate, and the like. Examples of the blocked isocyanate include blocked isocyanates in which isocyanate compounds (diphenylmethane diisocyanate, hexamethylene diisocyanate, toluene diisocyanate, isophorone diisocyanate, tolylene diisocyanate, and the like) are blocked by phenol, alcohol, dimethyl malonate, diethyl malonate, ethyl acetoacetate, oxime, dimethyl pyrazole, methyl ethyl ketone oxime, caprolactam, or the like. In the present disclosure, "(meth) acrylamide" may refer to methacrylamide or acrylamide.

From the viewpoint of suppressing degradation of the main chain of a resin component, such as a polycarbonate resin, caused by the shell of the thermally expandable microcapsules (A), it may be possible that the thermoplastic resin forming the shell contains at least one monomer selected from the group consisting of the nitrile monomer, the (meth)acrylate monomer, the aromatic vinyl monomer, and the vinyl monomer having a carboxyl group that have been described above. Moreover, the thermoplastic resin forming the shell may also contain a chain transfer agent and a monomer having a reactive functional group, as appropriate.

There is no particular limitation on the chain transfer agent, and any chain transfer agents that are used in ordinary radical polymerization can be used. Specifically a mercaptan compound can be used. For example, alkyl mercaptans, such as n-dodecyl mercaptan, n-octyl mercaptan, t-dodecyl mercaptan, and n-octadecyl mercaptan; 2-mercaptobenzothiazole; bromotrichloromethane; α-methyl styrene dimers; 2-ethylhexyl thioglycolate; and the like can be suitably used as the mercaptan compound.

From the viewpoint of preventing degradation of the resin component, such as a polycarbonate resin, and improving the surface characteristics of the injection molded foam, it may be possible that, in the thermoplastic resin forming the shell, the concentration of a constitutional unit derived from at least one monomer selected from the group consisting of a monomer containing a carboxyl group and a monomer containing an amino group is 12 mmol/g or less, 10 mmol/g or less, 8 mmol/g or less, 5 mmol/g or less, 3 mmol/g or less, or 1 mmol/g or less. The thermoplastic resin may contain substantially no monomers containing a carboxyl group and/or monomers containing an amino group. The lower limit of the concentration of the carboxyl group in the thermoplastic resin forming the shell may be 0.001 mmol/g or more.

From the viewpoint of suppressing degradation of the main chain of a resin, such as a polycarbonate resin, the concentration of an alkaline substance in the thermally expandable microcapsules (A) may be 2,000 ppm or less, 1,000 ppm or less, or 800 ppm or less. If the concentration of the alkaline substance is more than 2,000 ppm, there is a risk that a decrease in the molecular weight of the polycarbonate resin will occur, resulting in a reduction in strength of the molded foam. Examples of the alkaline substance include ion components derived from hydroxides (salts) of alkali metals and/or alkaline earth metals, or more specifically, ion components derived from hydroxides (salts) of metals such as Li, Na, Mg. K, Ca. and Ba.

It is desirable that the pH of the thermally expandable microcapsules (A) is circumneutral. Typically, the thermally expandable microcapsules (A) can be produced by performing suspension polymerization of a mixture containing a polymerizable monomer and a low-boiling-point compound for forming the core in an aqueous dispersion medium, and thereby enclosing the low-boiling-point compound serving as the core component in the shell of a thermoplastic resin composed of the monomer. It is desirable to adjust the pH of the thermally expandable microcapsules (A) during this polymerization, and typically, a method may be used in which a potassium hydrogen phosphate buffer is added. A preferable pH range is 6.0 or more and 8.0 or less, a more preferable pH range is 6.0 or more and 7.5 or less, and an even more preferable pH range is 6.0 or more and 7.0 or less. A glass electrode method may be used as the method for measuring the pH. In the glass electrode method, two electrodes, that is, a glass electrode and a reference electrode are used, and a difference in potential generated between the two electrodes is detected and converted into a pH value.

From the viewpoint of preventing a decrease in the molecular weight of the polycarbonate resin, it may be possible that, in the thermally expandable microcapsules (A), the thermoplastic resin forming the shell satisfies the following conditions. With respect to pellets obtained by kneading 95 parts by weight of the polycarbonate resin and 5 parts by weight of the thermoplastic resin forming the shell at 300° C. using a 30-mm-diameter single-screw extruder, the temperature at which a 5% weight loss occurs, as measured by TG/DTA, may be 200° C. or more, 220° C. or more, 240° C. or more, or 260° C. or more. Also, with regard to the weight average molecular weight Mw and the number average molecular weight Mn of the pellets, the retention rates of Mw and Mn relative to Mw and Mn of the polycarbonate resin may be each in a range of 60% or more, in a range of 80% or more, in a range of 90% or more, or in a range of 95% or more.

The thermally expandable microcapsules (A) may have an average particle size (in an unexpanded state) of 0.5 μm or more and 50 µm or less, 0.7 µm or more and 50 µm or less, 1.0 µm or more and 45 µm or less, 1.0 µm or more and 40 µm or less, and 1.0 µm or more and 35 µm or less. The maximum particle size of the thermally expandable microcapsules (A) when heated is approximately in a range of three to five times the average particle size in an unexpanded state. When the average particle size of the thermally expandable microcapsules (A) in an unexpanded state is 0.5 µm or more and 50 µm or less, the particle size in an expanded state is approximately 1.5 µm or more and 250 µm or less, and it is possible to significantly suppress a reduction in the Charpy impact strength and the surface impact strength during foaming. The average particle size of the thermally expandable microcapsules (A) in an unexpanded state can be measured using a particle size distribution measuring apparatus, or specifically a particle size distribution measuring apparatus, SALD-3000J, manufactured by Shimadzu Corporation.

The thermally expandable microcapsules (A) may have a maximum expansion temperature (also referred to as "maximum foaming temperature") of 180° C. or more and 300° C. or less, 190° C. or more and 290° C. or less, 200° C. or more and 280° C. or less, or 210° C. or more and 270° C. or less. In one or more embodiments of the present invention, the maximum expansion temperature of the thermally expandable microcapsules (A) can be measured using a measurement method disclosed in Japanese Patent No. 5484673. Specifically "TMA measurement" is performed using a TMA-7 model manufactured by PerkinElmer. About 0.25 mg of a sample is placed in a container, and the temperature is increased at a temperature increase rate of 5° C./min. Changes in the height of the sample are continuously measured, and the temperature at the time when the largest change in the height of the sample in the container occurs is used as the maximum expansion temperature. When the maximum expansion temperature of the thermally expandable microcapsules (A) is in the above-described range, it matches the molding temperature of the polycarbonate resin, and therefore, a low-density, high-strength injection molded foam is likely to be obtained.

<Carrier Resin Composition (B)>

The carrier resin composition (B) is substantially compatible with a polycarbonate resin and has a shear viscosity of 1.0 Pa·s or more and $1.5 \times 10^6$ Pa·s or less at 80° C. Thus, in a molded resin foam of a polycarbonate resin composition in which a masterbatch of the thermally expandable microcapsules (A) formed into the masterbatch with use of the carrier resin composition (B) is used, whitening is suppressed, and a good appearance is achieved. In the present disclosure, "being substantially compatible with a polycarbonate resin" specifically means that, in differential scanning calorimetry (DSC) of a mixture of the carrier resin composition (B) and a polycarbonate resin, the glass transition temperature has a single peak.

When the carrier resin composition (B) has a shear viscosity of 1.0 Pa·s or more and $1.5 \times 10^6$ Pa·s or less at 80° C., a masterbatch in which the thermally expandable microcapsules (A) are uniformly dispersed in the carrier resin composition (B) can be obtained. Specifically, when producing a masterbatch by kneading the thermally expandable microcapsules (A) and the carrier resin composition (B) at 130° C., no shear is applied to the thermally expandable microcapsules (A) because the viscosity of the carrier resin composition (B) is low, and it is thus possible to pelletize the thermally expandable microcapsules (A) without expanding them. From the viewpoint of improving processability during the production of a masterbatch, it may be possible that the shear viscosity of the carrier resin composition (B) at 80° C. is 1.0 Pa·s or more and $1.0 \times 10^6$ Pa·s or less, 1.0 Pa·s or more and $6 \times 10^5$ Pa·s or less, 1.0 Pa·s or more and $3 \times 10^5$ Pa·s or less, 5 Pa·s or more and $1.5 \times 10^5$ Pa·s or less, $1.0 \times 10^2$ Pa·s or more and $1.5 \times 10^5$ Pa·s or less, or $1.0 \times 10^1$ Pa·s or more and $1.5 \times 10^5$ Pa·s or less. The shear viscosity of the carrier resin composition (B) at 80° C. can be measured using a flow tester (model: CFTP500C) manufactured by Shimadzu Corporation. Specifically the measurement is started at a temperature of 50° C., and the carrier resin composition (B) is caused to flow through a 1.0-mm-diameter and 10-mm-long capillary under a constant load of 30 kgf. The temperature is increased at a rate of 10° C./min, and the shear viscosity at the point in time when the measurement temperature reaches 80° C. is measured.

<Carrier Resin (B1)>

Acrylic resins that have a weight average molecular weight of 8,000 or more and 350,000 or less can be used as the carrier resin (B). The carrier resin (B) may have a weight average molecular weight of 10,000 or more and 330,000 or less, 10,000 or more and 300,000 or less, 10,000 or more and 280,000 or less, 14,000 or more and 330.000 or less, 14,000 or more and 300,000 or less, 14,000 or more and 280,000 or less. 14,000 or more and 200,000 or less, or 14,000 or more and 100,000 or less. Alternatively, the weight average molecular weight of the carrier resin (B1) may be 16,000 or more and 330,000 or less, 16,000 or more and 300,000 or less, 16,000 or more and 280,000 or less, 16,000 or more and 200,000 or less, or 16,000 or more and 100,000 or less. Alternatively the weight average molecular weight of the carrier resin (B1) may be 19,000 or more and 330,000 or less, 19,000 or more and 300,000 or less, 19,000 or more and 280.000 or less, 19,000 or more and 200,000 or less, or 19,000 or more and 100,000 or less. In one or more embodiments of the present invention, the weight average molecular weight and the number average molecular weight of a resin are measured by GPC (gel permeation chromatography).

The carrier resin (B1) is a solid at 20° C. In this case, the carrier resin (B1) has excellent handleability, and hence the masterbatch (C) has good processability. From the viewpoint of handleability, it may be possible that the carrier resin (B1) is a solid at room temperature (more than 20° C. and 25° C. or less).

From the viewpoint of processability of the masterbatch (C), it may be possible that the carrier resin (B1) has a glass transition temperature of −30° C. or more and 150° C. or less, −10° C. or more and 140° C. or less, or 10° C. or more and 130° C. or less.

There is no particular limitation on the carrier resin (B1), and, for example, from the viewpoint of compatibility with a polycarbonate resin, it may be possible to use an acrylic resin containing acrylic resin particles (a) having an average particle size of 50 µm or more and 500 µm or less and acrylic resin particles (b) having an average particle size of 0.05 µm or more and 0.5 µm or less with which the acrylic resin particles (a) are coated.

Although it is sufficient that the acrylic resin particles (a) have an average particle size of 50 µm or more and 500 µm or less, the average particle size may be 75 µm or more and 300 µm or less, or 100 µm or more and 250 µm or less. Acrylic resin particles (a) having the above-described average particle size can be obtained using a suspension polymerization process. When the acrylic resin particles (a) have an average particle size of 50 µm or more, the filterability is good, and when acrylic resin particles (a) have an average particle size of 500 µm or less, uniform mixing can be achieved during powder mixing of the carrier resin (B1) with a particulate compounding ingredient. The average particle size of the acrylic resin particles (a) is measured using a Microtrac MT3300 manufactured by MicrotracBEL Corporation.

With regard to the carrier resin (B1), the wording "the acrylic resin particles (a) are coated with the acrylic resin particles (b)" may refer to a state in which the entire surface of an acrylic resin particle (a) is coated with acrylic resin particles (b) or a state in which the surface of an acrylic resin particle (a) is partially coated with acrylic resin particles (b). It may be possible that 50% or more, or more 60% or more, of the surface area of an acrylic resin particle (a) is coated with acrylic resin particles (b). When 50% or more of the surface area is coated, the carrier resin (B1) has favorable powder characteristics.

It may be possible that, as a result of the acrylic resin particles (a) being coated with the acrylic resin particles (b), the average particle size of the acrylic resin particles (a) is increased by 3% or more and 50% or less, compared with that of the acrylic resin particles (a) before being coated. If the change in the size of the acrylic resin particles (a) is less than 3%, the acrylic resin particles (a) will remain in the system, and there is hence a tendency that filterability is unlikely to be improved. That is to say; it may be possible that the average particle size of the carrier resin (B1) is larger than the average particle size of the acrylic resin particles (a) by 3% or more and 50% or less. The average particle size of the carrier resin (B1) is measured using a Microtrac MT3300 manufactured by MicrotracBEL Corporation.

From the viewpoint of the ease of control of dust associated with a polymer obtained by suspension polymerization, it may be possible that the acrylic resin particles (a) are composed of a (meth)acrylic acid ester in an amount of 30 to 100 wt % and a vinyl monomer copolymerizable with the (meth)acrylic acid ester in an amount of 0 to 70 wt %. It may be possible that the acrylic resin particles (a) are composed of a (meth)acrylic acid ester in an amount of 70 to 100 wt % and a vinyl monomer copolymerizable with the (meth) acrylic acid ester in an amount of 0 to 30 wt %. When the acrylic resin particles (a) contain a constitutional unit derived from a (meth)acrylic acid ester in an amount of 30 wt % or more, the acrylic resin particles (a) have good compatibility with the acrylic resin particles (b), and molding processing is favorably performed. In the present disclosure, the "(meth)acrylic acid" may refer to methacrylic acid or acrylic acid.

There is no particular limitation on the (meth)acrylic acid ester, and examples thereof include alkyl acrylates having an alkyl group having no more than 10 carbon atoms, such as methyl acrylate, ethyl acrylate, butyl acrylate, and 2-ethylhexyl acrylate; and alkyl methacrylates having an alkyl group having no more than 10 carbon atoms, such as methyl methacrylate, ethyl methacrylate, butyl methacrylate, and 2-ethylhexyl methacrylate. These (meth)acrylic acid esters may be used alone or in a combination of two or more. Among these, it may be possible to use at least one (meth) acrylic acid ester selected from the group consisting of methyl methacrylate, butyl methacrylate, ethyl acrylate, and butyl acrylate, because a molded foam with good quality is obtained when such a (meth)acrylic acid ester is combined with the acrylic resin particles (b).

There is no particular limitation on the vinyl monomer copolymerizable with the (meth)acrylic acid ester, and examples thereof include aromatic vinyl monomers, such as styrene, α-methyl styrene, monochlorostyrene, and dichlorostyrene; vinylcarboxylic acid monomers, such as acrylic acid and methacrylic acid; vinyl cyanate monomers, such as acrylonitrile and methacrylonitrile; halogenated vinyl monomers, such as vinyl chloride, vinyl bromide, and chloroprene; alkenes, such as vinyl acetate, ethylene, propylene, butylene, butadiene, and isobutylene; halogenated alkenes; multifunctional monomers, such as allyl methacrylate, diallyl phthalate, triallyl cyanurate, monoethylene glycol dimethacrylate, tetraethylene glycol dimethacrylate, tetraethylene glycol dimethacrylate, divinylbenzene, and glycidyl methacrylate; and the like. These vinyl monomers may be used alone or in a combination of two or more. Among these, it may be possible to use at least one vinyl monomer selected from the group consisting of styrene, α-methyl styrene, acrylic acid, methacrylic acid, acrylonitrile, vinyl acetate, allyl methacrylate, and glycidyl methacrylate, because a molded foam with good quality is obtained when such a vinyl monomer is combined with the acrylic resin particles (b).

The acrylic resin particles (a) may be homopolymer or mixed-polymer particles prepared from a polymer obtained by suspension polymerization, or in some cases copolymerization or graft polymerization, of at least one of the above-described monomers.

As a dispersion stabilizer for use in suspension polymerization, it is possible to use an ordinary inorganic or organic dispersant, for example. Examples of the inorganic dispersant include magnesium carbonate, tricalcium phosphate, and the like. Examples of the organic dispersant include natural high-molecular-weight dispersants and synthetic high-molecular-weight dispersants, such as starch, gelatin, acrylamide, partially saponified polyvinyl alcohol (PVA), partially saponified polymethyl methacrylate, polyacrylic acid, salts of polyacrylic acid, cellulose, methyl cellulose, hydroxymethyl cellulose, hydroxyethyl cellulose, polyalkylene oxide, polyvinyl pyrrolidone, polyvinyl imidazole, and polystyrene sulfonate; low-molecular-weight dispersants (also called "emulsifiers"), such as alkylbenzene sulfonate and fatty acid salts; and the like.

As a polymerization initiator for use in suspension polymerization, it is possible to use a peroxide, such as benzoyl peroxide or lauroyl peroxide, or an azo compound, such as azobisisobutyronitrile.

Moreover, a chain transfer agent may also be used in order to adjust the molecular weight. As the chain transfer agent, it is possible to use an alkyl mercaptan having 2 to 18 carbon atoms; a mercapto acid, such as a thioglycolic acid ester or 6-mercaptopropionic acid; an aromatic mercaptan, such as benzyl mercaptan, thiophenol, thiocresol, or thionaphthol; or the like. Examples of the alkyl mercaptan having 2 to 18 carbon atoms include n-dodecyl mercaptan, n-octyl mercaptan, t-dodecyl mercaptan, n-octadecyl mercaptan, and the like. Among these, it may be possible to use an alkyl mercaptan having 4 to 12 carbon atoms. Examples of the thioglycolic acid ester include 2-ethylhexyl thioglycolate and the like.

The amounts of the dispersion stabilizer, the polymerization initiator, and the chain transfer agent to be added can be set as appropriate, depending on the monomer used and the properties of the suspension polymer particles (acrylic resin particles (a)) to be obtained.

There is no particular limitation on the method for producing the suspension polymer particles, and all the typically applicable methods can be used. Examples of such methods include a method in which a monomer or a monomer mixture is suspended in water and subjected to a polymerization reaction on an "as is" basis; a method in which a portion of a monomer or a monomer mixture is suspended in water, a polymerization reaction is started, and while the polymerization reaction is conducted, an aqueous suspension of the remaining monomer or monomer mixture is added in one or several steps, or continuously, into a polymerization reaction vessel as the polymerization reaction progresses; a method in which a portion of a monomer or a monomer mixture is suspended in water, a polymerization reaction is started, and while the polymerization reaction is conducted, the remaining monomer or monomer mixture is added in one or several steps, or continuously, into a polymerization reaction vessel as the polymerization reaction progresses; and the like.

There is no particular limitation on the methods for adding the polymerization initiator and the chain transfer agent, and it may be possible to use a method in which both the polymerization initiator and the chain transfer agent are dissolved in a monomer, and the monomer is then suspended in water and subjected to a polymerization reaction on an "as is" basis. The time taken for the polymerization varies depending on the type and amount of the polymerization initiator, the polymerization temperature, and the like, and is usually 1 to 24 hours. Moreover, during the suspension polymerization, additives usually added during plastic processing, such as a plasticizer, a lubricant a stabilizer, and an ultraviolet absorber, may also be added to the monomer.

Although it is sufficient that the acrylic resin particles (b) have an average particle size of 0.05 μm or more and 0.5 μm or less, it may be possible that the average particle size is 0.06 μm or more and 0.3 μm or less. Acrylic resin particles (b) having the above-described average particle size can be obtained using an emulsion polymerization process. When the average particle size of the acrylic resin particles (b) is in the above-described range, processability during molding processing of the carrier resin (B1), as well as the impact strength and transparency of a molded foam to be obtained are likely to be favorable. The average particle size of the acrylic resin particles (b) is measured using a Microtrac MT3300 manufactured by MicrotracBEL Corporation.

The acrylic resin particles (b) may be composed of a (meth)acrylic acid ester in an amount of 30 to 100 wt % and a vinyl monomer copolymerizable with the (meth)acrylic acid ester in an amount of 0 to 70 wt %. It may be possible that the acrylic resin particles (b) are polymer particles obtained by polymerization of 50 to 90 parts by weight of latex particles (b1) composed of a (meth)acrylic acid ester in an amount of 50 to 100 wt %, an aromatic vinyl monomer in an amount of 0 to 40 wt %, a vinyl monomer copolymerizable with the (meth)acrylic acid ester and the aromatic vinyl monomer in an amount of 0 to 10 wt %, and a multifunctional monomer in an amount of 0 to 5 wt % with 10 to 50 parts by weight of a monomer mixture (b2) containing a (meth)acrylic acid ester in an amount of 10 to 100 wt %, an aromatic vinyl monomer in an amount of 0 to 90 wt %, a vinyl cyanate monomer in an amount of 0 to 25 wt %, and a vinyl monomer copolymerizable with the (meth)acrylic acid ester, the aromatic vinyl monomer, and the vinyl cyanate monomer in an amount of 0 to 20 wt %, and the total amount of the latex particles (b1) and the monomer mixture (b2) is 100 parts by weight.

There is no particular limitation on the (meth)acrylic acid ester constituting the acrylic resin particles (b), and, for example, the (meth)acrylic acid esters that have been listed above in the description of the acrylic resin particles (a) may be used as appropriate. Also, there is no particular limitation on the aromatic vinyl monomer, the vinyl cyanate monomer, the multifunctional monomer, and the other copolymerizable vinyl monomer constituting the acrylic resin particles (b), and, for example, those listed above in the description of the acrylic resin particles (a) may be used as appropriate.

It may be possible that the acrylic resin particles (b) are emulsion polymer particles obtained by graft polymerization of 70 to 95 parts by weight of latex particles (b1) obtained by emulsion polymerization of a monomer mixture (a) containing methyl methacrylate in an amount of 50 to 95 wt %, a methacrylic acid ester having an alkyl group having 2 to 8 carbon atoms in an amount of 5 to 50 wt %, and a vinyl monomer copolymerizable with methyl methacrylate and the methacrylic acid ester in an amount of 0 to 20 wt % with 5 to 30 parts by weight of a monomer mixture (2) containing at least one monomer selected from the group consisting of methacrylic acid esters excluding acrylic acid esters and methyl methacrylate in an amount of 20 to 80 wt %, methyl methacrylate in an amount of 20 to 80 wt %, and a vinyl monomer copolymerizable with the at least one monomer and the methyl methacrylate in an amount of 0 to 20 wt %, where the total amount of the latex particles (b1) and the monomer mixture (b2) is 100 parts by weight. Specifically the acrylic resin particles (b) may be emulsion polymer particles obtained by preparing a polymer latex by performing emulsion polymerization of 70 to 95 parts by weight of a monomer mixture (I) containing methyl methacrylate in an amount of 50 to 95 wt %, a methacrylic acid ester having an alkyl group having 2 to 8 carbon atoms in an amount of 5 to 50 wt %, and a vinyl monomer copolymerizable with the methyl methacrylate and the methacrylic acid ester in an amount of 0 to 20 wt %, and then performing graft polymerization of 5 to 30 parts by weight of a monomer mixture (II) containing at least one monomer selected from the group consisting of acrylic acid esters and methacrylic acid esters excluding methyl methacrylate in an amount of 20 to 80 wt %, methyl methacrylate in an amount of 20 to 80 wt %, and a vinyl monomer copolymerizable with the at least one monomer and the methyl methacrylate in an amount of 0 to 20 wt %, in the presence of the prepared polymer latex, where the total amount of the monomer mixture (I) and the monomer mixture (II) is 100 parts by weight.

The acrylic resin particles (b) may be emulsion polymer particles obtained by preparing a first-stage polymer through polymerization of a monomer mixture (I) containing methyl methacrylate in an amount of 40 to 99.99 wt %, a vinyl monomer copolymerizable with the methyl methacrylate in an amount of 0 to 59.99 wt %, and a multifunctional monomer in an amount of 0.01 to 10 wt %, then preparing second-stage polymer particles (latex particles (b1)) through polymerization of 10 to 60 parts by weight of the first-stage polymer and 40 to 90 parts by weight of a monomer mixture (IV) containing an alkyl acrylate in an amount of 60 to 99.9 wt %, a vinyl monomer copolymerizable with the alkyl acrylate in an amount of 0 to 39.9 wt %, and a multifunctional monomer in an amount of 0.1 to 5 wt %, where the total amount of the monomer mixture (III) and the monomer mixture (V) is 100 parts by weight, and polymerizing 100 parts by weight of the second-stage polymer particles (latex particles (b1)) with 11 to 67 parts by weight of a monomer mixture containing a (meth)acrylic acid ester in an amount of 60 to 100 wt % and a vinyl monomer copolymerizable with the (meth)acrylic acid ester in an amount of 0 to 40 wt %. Specifically the acrylic resin particles (b) are emulsion polymer particles having a three-layer structure obtained by preparing a first-stage polymer latex through emulsion polymerization of 10 to 60 parts by weight of a monomer mixture (ID containing methyl methacrylate in an amount of 40 to 99.99 wt %, a vinyl monomer copolymerizable with the methyl methacrylate in an amount of 0 to 59.99 wt %, and a multifunctional monomer in an amount of 0.01 to 10 wt %, then preparing a second-stage polymer latex through emulsion polymerization of 40 to 90 parts by weight of a monomer mixture (IV) containing an alkyl acrylate in an amount of 60 to 99.9 wt %, a vinyl monomer copolymerizable with the alkyl acrylate in an amount of 0 to 39.9 wt %, and a multifunctional monomer in an amount of 0.1 to 5 wt %, in the presence of the first-stage polymer latex, where the total amount of the monomer mixture (III) and the monomer mixture (IV) is 100 parts by weight, and further polymerizing 11 to 67 parts by weight of a monomer mixture (b2) containing a (meth)acrylic acid ester in an amount of 60 to 100 wt % and a vinyl monomer copolymerizable with the (meth)acrylic acid ester in an amount of 0 to 40 wt %, in the presence of 100 parts by weight of the solid component (latex particles (b1)) of the second-stage polymer latex.

It may be possible that the latex particles (b1) have a glass transition temperature of 0° C. or less, or −30° C. or less. When the latex particles (b1) have a glass transition temperature of 0° C. or less, the impact strength of the injection molded foam is likely to be improved.

It may be possible that the carrier resin (B) contains the acrylic resin particles (b) in an amount of 22 parts by weight or more and 100 parts by weight or less, 25 parts by weight or more and 100 parts by weight or less, or 30 parts by weight or more and 100 parts by weight or less, with respect to 100 parts by weight of the acrylic resin particles (a). If the amount of the acrylic resin particles (b) is less than 22 parts by weight with respect to 100 parts by weight of the acrylic resin particles (a), there is a risk that filterability will not be improved. On the other hand, if the amount of the acrylic resin particles (b) is more than 100 parts by weight with respect to 100 parts by weight of the acrylic resin particles (a), there is a risk that the water content of the carrier resin (B1) after dehydration will be high.

For example, the carrier resin (B) can be produced in the following manner without limitation. First, a suspension containing acrylic resin particles (a) is prepared by suspension polymerization, and an emulsion polymerization latex containing acrylic polymer particles (b) is prepared by emulsion polymerization. Next, the suspension and the emulsion polymerization latex are mixed. Then, the solid concentration (total concentration of the acrylic polymer particles (a) and the acrylic polymer particles (b)) in the obtained mixed suspension is adjusted to 25 wt % or more and 35 wt % or less. Then, to the mixed suspension in which the solid concentration has been adjusted is added an aqueous electrolyte solution at a temperature of no more than the Vicat softening temperature of the acrylic polymer particles (b), followed by heating to a temperature more than the Vicat softening temperature of the acrylic polymer particles (b), and after that, the carrier resin (B) is collected by solid-liquid separation. With the above-described production method, the surface of the acrylic polymer particles (a) can be uniformly coated with the acrylic polymer particles (b), and the amount of remaining acrylic polymer particles (b), which may cause a decrease in filterability can be significantly reduced.

As the method for mixing the suspension containing the acrylic resin particles (a), which is obtained by suspension polymerization, and the emulsion polymerization latex containing the acrylic polymer particles (b), which is obtained by emulsion polymerization, it may be possible to add the emulsion polymerization latex to the suspension under stirring, or add the suspension to the emulsion polymerization latex under stirring.

With regard to the ratio between the solid content of the suspension containing the acrylic resin particles (a) and the solid content of the emulsion polymerization latex containing the acrylic polymer particles (b), it may be possible that the amount of the acrylic polymer particles (b) is 22 parts by weight or more and 100 parts by weight or less, 25 parts by weight or more and 100 parts by weight or less, or 30 parts by weight or more and 100 parts by weight or less, with respect to 100 parts by weight of the acrylic resin particles (a). When the amount of the acrylic polymer particles (b) is 22 parts by weight or more with respect to 100 parts by weight of the acrylic resin particles (a), the amount of acrylic resin particles (b) remaining in the system is reduced, and as a result, filterability is likely to be improved. Moreover, when the amount of the acrylic polymer particles (b) is 100 parts by weight or less with respect to 100 parts by weight of the acrylic resin particles (a), the water content after dehydration of the carrier resin (B1) to be obtained is low.

When mixing the suspension and the emulsion polymerization latex, there is no particular limitation on the solid concentrations in the suspension and the emulsion polymerization latex, and it is most simple and convenient in terms of production and is therefore preferable that an emulsion polymerization latex or a suspension polymerization suspension obtained through an ordinary polymerization operation is used on an "as is" basis. Usually, the solid concentration (concentration of the acrylic resin particles (a)) in the suspension containing the acrylic resin particles (a) may be 25 wt % or more and 55 wt % or less, 30 wt % or more and 45 wt % or less, 33 wt % or more and 45 wt % or less, or 35 wt % or more and 40 wt % or less. The solid concentration (concentration of the acrylic resin particles (b)) in the emulsion polymerization latex containing the acrylic resin particles (b) may be 25 wt % or more and 55 wt % or less, 25 wt % or more and 45 wt % or less, 30 wt % or more and 45 wt/o or less, or 30 wt/o or more and 40 wt % or less. The temperature during the mixing may be 5° C. or more, and a temperature of less than 5° C. tends to be unfavorable because the amount of utilities used for a subsequent heat treatment operation will be large.

The solid concentration (concentration of polymer particles) in the mixed suspension during the addition of the aqueous electrolyte solution may be 25 wt % or more and 35 wt % or less, or 27 wt % or more and 33 wt % or less. When the concentration of the polymer particles (solid component) in the mixed suspension during the addition of the aqueous electrolyte solution is 25 wt % or more, the generation of fine aggregates with a particle size of 50 μm or less in the mixed suspension after the aqueous electrolyte solution has been added and heat treatment has been performed is suppressed, and thus, good filterability is obtained, and also the water content of the carrier resin (B1) after dehydration is low. Moreover, when the concentration of polymer particles in the mixed suspension during the addition of the aqueous electrolyte solution is 35 wt % or less, the generation of secondary aggregate particles via the acrylic resin particles (b) is suppressed, and thus, the water content of the carrier resin (B1) after dehydration is low.

It may be possible that the aqueous electrolyte solution is added to the mixed suspension under stirring. With this operation, the acrylic resin particles (b), which are emulsion polymer particles, are coagulated (deposited) on the surface of the acrylic resin particles (a), which are suspension polymer particles, and thereby the surface of the acrylic resin particles (a) is coated with the acrylic resin particles (b). The addition of the aqueous electrolyte solution needs to be performed after the suspension obtained by suspension polymerization and the emulsion polymerization latex have been mixed. The reason for this is that, if the aqueous electrolyte solution is present during the mixing of the suspension obtained by suspension polymerization and the emulsion polymerization latex, there is a tendency that, not only the generated carrier resin (B) has a distorted shape, resulting in a high water content after dehydration, but also unsolidified acrylic resin particles (b) remain, resulting in an extreme decrease in filterability. For example, if the emulsion polymerization latex is added after the aqueous electrolyte solution has been added to the suspension obtained by suspension polymerization, problems occur in that the uniformity of coating of the surface of the acrylic resin particles (a) with the acrylic resin particles (b) decreases, and also the amount of remaining acrylic polymer particles (b), which may cause a decrease in filterability, significantly increases.

As the aqueous electrolyte solution, aqueous solutions of an organic acid, an organic acid salt, an inorganic acid, and an inorganic salt that are capable of coagulating and solidifying the acrylic resin particles (b) may be used as appropriate. Examples of the aqueous electrolyte solution include aqueous solutions of inorganic salts, such as sodium chloride, potassium chloride, lithium chloride, sodium bromide, potassium bromide, lithium bromide, potassium iodide, sodium iodide, potassium sulfate, sodium sulfate, ammonium sulfate, ammonium chloride, sodium nitrate, potassium nitrate, calcium chloride, ferrous sulfate, magnesium sulfate, zinc sulfate, copper sulfate, barium chloride, ferrous chloride, ferric chloride, magnesium chloride, ferric sulfate, aluminum sulfate, potassium alum, and iron alum; aqueous solutions of inorganic acids, such as hydrochloric acid, sulfuric acid, nitric acid, and phosphoric acid; organic acids, such as acetic acid and formic acid, and aqueous solutions thereof aqueous solutions of organic acid salts, such as sodium acetate, calcium acetate, sodium formate, and calcium formate; and the like. These aqueous electrolyte solutions may be used alone or may be used as a mixture of two or more. Among these, from the viewpoint of the uniformity of coating of the surface of the acrylic resin particles (a) with the acrylic resin particles (b), a significant reduction in the amount of remaining acrylic polymer particles (b), which may cause a decrease in filterability; and the ease of drainage treatment, aqueous solutions of inorganic salts such as sodium chloride, potassium chloride, sodium sulfate, ammonium chloride, calcium chloride, magnesium chloride, magnesium sulfate, barium chloride, ferrous chloride, aluminum sulfate, potassium alum, and iron alum, as well as aqueous solutions of inorganic acids such as hydrochloric acid, sulfuric acid, and nitric acid can be suitably used.

The concentration of the aqueous electrolyte solution may be 0.001 wt % or more, 0.1 wt % or more, or 1 wt % or more. If the concentration of the aqueous electrolyte solution is less than 0.001 wt %, a large amount of aqueous electrolyte solution needs to be added in order to coagulate the acrylic resin particles (b), and there is a risk that the amount of utilities used during a subsequent heat treatment operation will be large.

The addition of the aqueous electrolyte solution needs to be performed at a temperature of no more than the Vicat softening temperature of the acrylic resin particles (b). If the temperature of the mixed suspension exceeds the Vicat softening temperature of the acrylic resin particles (b) during the addition of the aqueous electrolyte solution, there is a risk that the generated carrier resin (B1) will have a distorted shape, resulting in a high water content after dehydration, and unsolidified acrylic resin particles (b) remain, causing an extreme decrease in filterability, or resulting in a tendency that aggregation of the carrier resin (B1) occurs frequently.

If the proportion of the emulsion polymerization latex in the mixed suspension is high, or if the rate at which the aqueous electrolyte solution is added is extremely high, or the concentration of the aqueous electrolyte solution is extremely high, a significant increase in viscosity may be observed during the addition of the aqueous electrolyte solution. In such cases, an operation, such as appropriately adding water into the system, for reducing the viscosity of the system can be performed to such an extent that a normal stirring state can be maintained. It goes without saying that the amount of aqueous electrolyte solution to be added varies depending on the proportion of the acrylic resin particles (b) in the mixed suspension, but it is sufficient that the aqueous electrolyte solution is added in at least an amount with which no unsolidified acrylic resin particles (b) will be present after the heat treatment.

After the aqueous electrolyte solution has been added to the mixed suspension, it may be possible that the mixed suspension, after being neutralized with an alkali such as sodium hydroxide if the aqueous electrolyte solution is an acidic aqueous solution and the mixed suspension after granulation is acidic, or without being subjected to any treatment if the aqueous electrolyte solution is a neutral aqueous solution, is heat-treated at a temperature higher than the Vicat softening temperature of the acrylic polymer particles (b), for example, 50 to 120° C. The heat treatment densifies the aggregates of the acrylic polymer particles (b), with which the surface of the acrylic polymer particles (a) is coated, and thus lowers the water content of the carrier resin (B1) to be obtained. After that, dehydration and drying are performed in accordance with a routine method, and as a result, the carrier resin (B1) is obtained.

<Plasticizer (B2)>

Plasticizers that have a weight average molecular weight of 1,000 or more and 20.000 or less can be used as the plasticizer (B2). With such a plasticizer, a carrier resin composition (B) having a shear viscosity of 1.0 Pa·s or more and $1.5 \times 10^6$ Pa·s or less at 80° C. can be obtained. The weight average molecular weight of the plasticizer (B2) may be 1,000 or more and 18,000 or less, 1,000 or more and 15,000 or less, or 1,000 or more and 13,000 or less. From the viewpoint of compatibility with a polycarbonate resin, for example, an acrylic plasticizer, a polyester plasticizer, or the like can be suitably used as the plasticizer (B2), and it is more preferable to use an acrylic plasticizer.

It may be possible that the viscosity of the plasticizer (B2) at 25° C. is 300 mPa·s or more and 100,000 mPa·s or less, 350 mPa·s or more and 90,000 mPa·s or less, or 400 mPa·s or more and 80,000 mPa·s or less. When the viscosity of the plasticizer (B2) at 25° C. is within the above-described range, a carrier resin composition (B) having a shear viscosity of 1.0 Pa·s or more and $1.5 \times 10^6$ Pas or less at 80° C. is likely to be obtained. The plasticizer (B2) is a liquid at 20° C. In this case, the masterbatch (C) has good processability. The plasticizer (B2) may be in liquid form at room temperature (more than 20° C. and 25° C. or less). The viscosity of the plasticizer (B2) at 25° C. can be measured using an E-type viscometer in conformity with JIS Z 8803-1991.

A plasticizer commonly known as an acrylic plasticizer can be used as the plasticizer (B2), and it is preferable to use an acrylic plasticizer of a type containing no functional group. Examples of the acrylic plasticizer include a (meth) acrylic acid ester polymer, a (meth)acrylic acid ester-aromatic vinyl monomer copolymer, and the like, and it may be possible to use a (meth)acrylic acid ester polymer. The (meth)acrylic acid ester polymer includes a homopolymer of an alkyl acrylate ester, a homopolymer of an alkyl methacrylate ester, a copolymer of alkyl acrylate esters, a copolymer of alkyl methacrylate esters, and a copolymer of an alkyl acrylate ester and an alkyl methacrylate ester. There is no particular limitation on the (meth)acrylic acid ester constituting the acrylic plasticizer, and, for example, the (meth)acrylic acid esters that have been listed above in the description of the acrylic resin particles (a) may be used as appropriate. Also, there is no particular limitation on the aromatic vinyl monomer constituting the acrylic plasticizer, and, for example, those listed above in the description of the acrylic resin particles (a) may be used as appropriate.

Specifically commercially available acrylic plasticizers of a type containing no functional group, such as the ARUFON UP-1000 series, including the product names "UP-1000", "UP-1010", "UP-1020", "UP-1021", "UP-1061", and "UP-1500", manufactured by Toagosei Co., Ltd. can be used as the plasticizer (32) without limitation.

<Masterbatch (C)>

The masterbatch (C) contains the thermally expandable microcapsules (A) and the carrier resin composition (B), and the carrier resin composition (B) contains the carrier resin (B1) and the plasticizer (B2). In the masterbatch (C), the carrier resin composition (B) mixed with the thermally expandable microcapsules (A) has a shear viscosity of 1.0 Pas or more and $1.5 \times 10^6$ Pas or less at 80° C., and thus, a masterbatch in which the thermally expandable microcapsules (A) are uniformly dispersed without impairing the foaming power can be obtained using the carrier resin composition (B). In addition to this, the carrier resin composition (B) is substantially compatible with a polycarbonate resin, and thus, when the masterbatch (C) is used, an injection molded foam in which whitening is suppressed and which has a good appearance can be obtained. That is to say in foam injection molding using the masterbatch (C) of the thermally expandable microcapsules (A) obtained above, the foaming power is not impaired, and a molded foam having a good appearance can be obtained.

From the viewpoint of handleability, storage stability, dispersibility in a base material resin, and the like, it may be possible that the concentration of the thermally expandable microcapsules (A) in the masterbatch (C) is 30 wt/o or more and 80 wt %, 30 wt % or more and 70 wt % or less, or 30 wt % or more and 60 wt % or less.

From the viewpoint of compatibility with a polycarbonate resin and processability it may be possible that the masterbatch (C) contains the carrier resin composition (B) in an amount of 20 wt % or more and 70 wt % or less, more 30 wt % or more and 70 wt % or less, or 40 wt % or more and 70 wt % or less.

From the viewpoint of compatibility with a polycarbonate resin and shear viscosity at 80° C., specifically it may be possible that the masterbatch (C) contains the thermally expandable microcapsules (A) in an amount of 30 wt % or more and 80 wt/o or less, the carrier resin (B1) in an amount of 15 wt % or more and 65 wt % or less, and the plasticizer (B2) in an amount of 5 wt/o or more and 30 wt % or less, and the amount of the carrier resin (B1) is larger than the amount of the plasticizer (B2). It may be possible that the masterbatch (C) contains the thermally expandable microcapsules (A) in an amount of 30 wt % or more and 80 wt % or less, the carrier resin (B1) in an amount of 15 wt % or more and 40 wt % or less, and the plasticizer (B2) in an amount of 5 wt % or more and 30 wt % or less. Even more preferably the masterbatch (C) contains the thermally expandable microcapsules (A) in an amount of 30 wt % or more and 80 wt % or less, the carrier resin (B1) in an amount of 12 wt % or more and 50 wt % or less, and the plasticizer (B2) in an amount of 8 wt % or more and 25 wt % or less. Particularly preferably, the masterbatch (C) contains the thermally expandable microcapsules (C) in an amount of 30 wt % or more and 80 wt % or less, the carrier resin (B1) in an amount of 12 wt % or more and 45 wt % or less, and the plasticizer (32) in an amount of 8 wt % or more and 20 wt % or less.

The masterbatch (C) can be suitably used for a polycarbonate resin. The polycarbonate resin may be a polycarbonate resin (G) itself which will be described later, or may be a mixed resin of the polycarbonate resin (G) and at least one other thermoplastic resin selected from the group consisting of a polyester resin a polyester-polyether copolymer, an acrylonitrile-butadiene-styrene copolymer, an acrylonitrile-ethylene-propylene-diene-styrene copolymer, an acrylate-styrene-acrylonitrile copolymer, an acrylonitrile-styrene copolymer, a polyarylate resin, a polystyrene resin, and a polyamide resin. In the case where the polycarbonate resin is a mixed resin, of all the resins contained in the mixed resin, the amount of the polycarbonate resin (G) is the largest. In the case where the polycarbonate resin is a mixed resin, it may be possible that the masterbatch (C) is compatible with the mixed resin <Polycarbonate Resin Composition>

The polycarbonate resin composition is a resin composition containing the polycarbonate resin (G) and the masterbatch (C), the polycarbonate resin constituting the main component of the resin composition. Here, the "main component" means that, of all the components contained in the polycarbonate resin composition, the amount of the polycarbonate resin is the largest. Note that components of the polycarbonate resin composition other than the masterbatch (C) will also be referred to as "base material components".

The amount of the masterbatch (C) contained in the polycarbonate resin composition can be set as appropriate, depending on the expansion ratio of an end product, the type of the blowing agent, the resin temperature during molding, and the like. The amount of the masterbatch (C) contained in the polycarbonate resin composition may be 1 wt % or more and 20 wt % or less, 2 wt % or more and 15 wt % or less, or 3 wt % or more and 10 wt % or less. When the masterbatch (C) is used in an amount in this range, a molded foam having an expansion ratio of 1.1 times or more and having uniformly fine cells is likely to be economically obtained.

<Polycarbonate Resin (G)>

The polycarbonate resin (G) is a polycarbonate resin derived from a compound (hereinafter referred to as "dihydric phenol") having two phenolic hydroxyl groups and is usually a resin obtained through a reaction of dihydric phenol and phosgene, or dihydric phenol and a carbonic acid diester.

Examples of the dihydric phenol include biphenol, methylene bisphenol (bisphenol F), bis(4-hydroxyphenyl)sulfone (bisphenol S), 2,2-bis(4-hydroxyphenyl)propane (bisphenol A), and the like. Among these, bisphenol A is preferable, but one or more embodiments of the present invention are not limited to this.

From the viewpoint of impact resistance, chemical resistance, molding processability and the like, it may be possible that the polycarbonate resin (G) has a number average molecular weight of 10,000 or more and 60,000 or less, or 10,000 or more and 30,000 or less. The amount of the polycarbonate resin (G) contained in the polycarbonate resin composition may be 30 wt % or more and 99 wt % or less, 30 wt % or more and 80 wt % or less, or 30 wt % or more and 70 wt % or less.

The polycarbonate resin composition may further contain at least one other thermoplastic resin selected from the group consisting of a polyester resin, a polyester polyether copolymer, an acrylonitrile-butadiene-styrene copolymer, an acrylonitrile-ethylene-propylene-diene-styrene copolymer, an acrylate-styrene-acrylonitrile copolymer, an acrylonitrile-styrene copolymer, a polyarylate resin, a polystyrene resin, and a polyamide resin.

<Polyester Resin (H1)>

As the polyester resin (H1), it is possible to use an amorphous thermoplastic polyester resin, such as an amorphous aliphatic polyester, an amorphous semi-aromatic polyester, or an amorphous fully aromatic polyester; a crystalline thermoplastic polyester resin, such as a crystalline aliphatic polyester, a crystalline semi-aromatic polyester, or a crystalline fully aromatic polyester; a liquid crystalline thermoplastic polyester resin, such as a liquid crystalline aliphatic polyester, a liquid crystalline semi-aromatic polyester, or a liquid crystalline fully aromatic polyester; or the like.

Specific examples of the crystalline thermoplastic polyester include crystalline copolymerized polyesters, such as polyethylene terephthalate, polypropylene terephthalate, polybutylene terephthalate, polyethylene-2,6-naphthalate, polybutylene naphthalate, poly1,4-cyclohexylenedimethylene terephthalate, polyethylene-1,2-bis(phenoxy)ethane-4,4'-dicarboxylate, polyethylene isophthalate/terephthalate, polybutylene terephthalate/isophthalate, polybutylene terephthalate/decane dicarboxylate, and polycyclohexanedimethylene terephthalate/isophthalate; and the like. Among these, it may be possible to use polyethylene terephthalate, polypropylene terephthalate, polybutylene terephthalate, polyethylene-2,6-naphthalate, polybutylene naphthalate, poly1,4-cyclohexylenedimethylene terephthalate, or the like. From the viewpoint of obtaining an injection molded foam with a good appearance, the amount of the thermoplastic polyester resin (H1) contained in the polycarbonate resin composition may be 0 to 60 wt %, 0 to 50 wt %, or 0 to 40 wt %.

<Polyester-Polyether Copolymer (H2)>

It may be possible that the polyester-polyether copolymer (H2) contains an aromatic polyester unit and a polyether unit. Examples of the polyether unit include those represented by general formulae (1), (2), (3), (4), (5), and (6) below. Among these, it may be possible to use a polyester unit represented by the general formula (6).

Chemical Formula 1

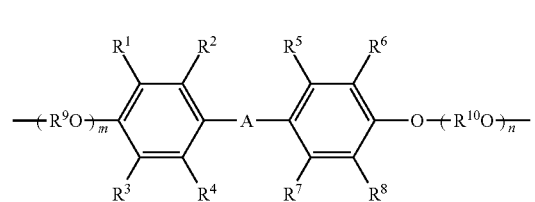

(1)

In the general formula (1), -A- represents —O—, —S—, —SO—, —SO$_2$—, —CO—, an alkylene group having 1 to 20 carbon atoms, or an alkylidene group having 6 to 20 carbon atoms. $R^1$, $R^2$, $R^3$, $R^4$, $R^5$, $R^6$, $R^7$ and $R^8$ each represent a hydrogen atom, a halogen atom, or a monovalent hydrocarbon group having 1 to 5 carbon atoms. $R^9$ and $R^{10}$ each represent a divalent hydrocarbon group having 1 to 5 carbon atoms, m and n represent the number of repeating oxyalkylene units, and m and n are each an integer of 0 to 70, where 10≤m+n≤70. Preferably m and n are each an integer of 0 to 50. More preferably m is an integer of 2 to 70.

Chemical Formula 2

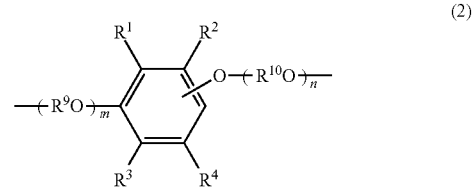

(2)

In the general formula (2), $R^1$, $R^2$, $R^3$, and $R^4$ each represent a hydrogen atom, a halogen atom, or a monovalent hydrocarbon group having 1 to 5 carbon atoms. $R^9$ and $R^{10}$ each represent a divalent hydrocarbon group having 1 to 5 carbon atoms, m and n represent the number of repeating oxyalkylene units, and m and n are each an integer of 0 to 70, where 10≤m+n≤70. Preferably m and n are each an integer of 0 to 50. More preferably m is an integer of 2 to 70.

Chemical Formula 3

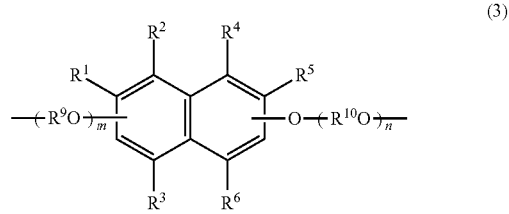

(3)

In the general formula (3), $R^1$, $R^2$, $R^3$, $R^4$, $R^5$, and $R^6$ each represent a hydrogen atom, a halogen atom, or a monovalent hydrocarbon group having 1 to 5 carbon atoms. $R^9$ and $R^{10}$ each represent a divalent hydrocarbon group having 1 to 5 carbon atoms, m and n represent the number of repeating oxyalkylene units, and m and n are each an integer of 0 to 70, where 10≤m+n≤70. Preferably m and n are each an integer of 0 to 50. More preferably m is an integer of 2 to 70.

Chemical Formula 4

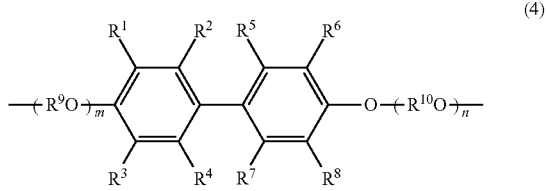

(4)

In the general formula (4), $R^1$, $R^2$, $R^3$, $R^4$, $R^5$, $R^6$, $R^7$, and $R^8$ each represent a hydrogen atom, a halogen atom, or a monovalent hydrocarbon group having 1 to 5 carbon atoms. $R^9$ and $R^{10}$ each represent a divalent hydrocarbon group having 1 to 5 carbon atoms, m and n represent the number of repeating oxyalkylene units, and m and n are each an integer of 0 to 70, where 10≤m+n≤70. Preferably m and n are each an integer of 0 to 50. More preferably m is an integer of 2 to 70.

Chemical Formula 5

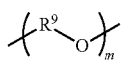
(5)

In the general formula (5), $R^9$ represents a divalent hydrocarbon group having 1 to 5 carbon atoms, m represents the number of repeating oxyalkylene units, and m is an integer of 2 to 70.

Chemical Formula 6

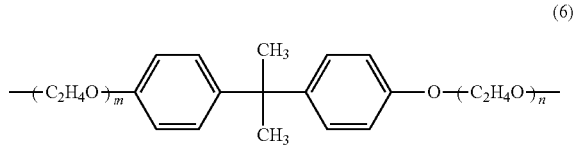
(6)

In the general formula (6), m and n represent the number of repeating oxyalkylene units, and m and n are each an integer of 0 to 50, where 10≤m+n≤50.

The aromatic polyester unit is an alternating polycondensate composed of an aromatic dicarboxylic acid or an aromatic dicarboxylic acid ester and a diol Examples of the aromatic polyester unit include polyalkylene terephthalate units, such as polyethylene terephthalate, polypropylene terephthalate, and polybutylene terephthalate; polyalkylene naphthalate units, such as polyethylene naphthalate, polypropylene naphthalate, and polybutylene naphthalate; and the like. Among these, a polyalkylene terephthalate unit is preferable, and a polyethylene terephthalate unit is more preferable. Examples of the aromatic dicarboxylic acid include terephthalic acid, isophthalic acid, diphenyl dicarboxylic acid, diphenoxyethane dicarboxylic acid, and the like. Among these, terephthalic acid is preferable. Examples of the aromatic dicarboxylic acid ester include dialkyl esters of the aromatic dicarboxylic acid. Moreover, in addition to the aromatic dicarboxylic acid, other aromatic oxycarboxylic acids, such as oxybenzoic acid, as well as aliphatic or alicyclic dicarboxylic acids, such as adipic acid, sebacic acid, and cyclohexane-1,4-dicarboxylic acid, may also be used. Examples of the diol include glycols having 2 to 10 carbon atoms, such as ethylene glycol, trimethylene glycol, tetramethylene glycol, hexanediol, decanediol, and cyclohexanedimethanol. With regard to the solution viscosity of the aromatic polyester, from the viewpoint of impact resistance, chemical resistance, and molding processability of a molded article to be obtained, it may be possible that, in a mixed solvent of phenol/tetrachloroethane=1/1 (weight ratio), the logarithmic viscosity (IV value) at a concentration of 0.5 g/dl at 25° C. is 0.3 or more and 1.0 or less.

There is no particular limitation on the method for producing the polyester polyether copolymer (H2), and examples include: (1) a direct esterification method in which an aromatic dicarboxylic acid, a diol and a polyether are reacted; (2) a transesterification method in which an aromatic dicarboxylic acid dialkyl ester, a diol, and a polyether are reacted; (3) a method in which, during or after transesterification of an aromatic dicarboxylic acid dialkyl ester and a diol, a modified polyether is added, and polycondensation is performed; (4) a method in which a high molecular weight aromatic polyester is used, and after mixing with a polyether, transesterification is performed in a molten state under reduced pressure; and the like.

From the viewpoint of obtaining an injection molded foam with a good appearance, the amount of the polyester-polyether copolymer (H2) contained in the polycarbonate resin composition may be 0 to 60 wt %, 0 to 50 wt %, or 0 to 40 wt %.

<Acrylonitrile-Butadiene-Styrene Copolymer (H3)>

From the viewpoint of obtaining the appearance improving effect and maintaining heat resistance, it may be possible that the acrylonitrile-butadiene-styrene copolymer is contained in an amount of 0 to 50 wt %, with respect to 100 wt % of the polycarbonate resin composition, and the range of the amount of the acrylonitrile-butadiene-styrene copolymer is 0 to 40 wt %, or 0 to 30 wt %.

It is sufficient that the amount of butadiene contained in the acrylonitrile-butadiene-styrene copolymer is 10 to 30 wt %.

As the acrylonitrile-butadiene-styrene copolymer, an acrylonitrile-butadiene-styrene copolymer may be used in which a portion of styrene is replaced with α-methyl styrene and which thereby has improved heat resistance compared with ordinary acrylonitrile-butadiene-styrene copolymers. An acrylonitrile-butadiene-styrene copolymer with further improved heat resistance, such as an acrylonitrile-butadiene-styrene copolymer modified with phenyl maleimide, can also be used as appropriate.

From the viewpoint of effectively suppressing whitening of the surface of an injection molded foam and obtaining a good appearance, it may be possible that the polycarbonate resin composition contains the masterbatch (C) in an amount of 1 to 15 wt %, the polycarbonate resin (G) in an amount of 30 to 99 wt %, and the at least one thermoplastic resin selected from the group consisting of a polyester resin, a polyester-polyether copolymer, an acrylonitrile-butadiene-styrene copolymer, an acrylonitrile-ethylene-propylene-diene-styrene copolymer, an acrylate-styrene-acrylonitrile copolymer, an acrylonitrile-styrene copolymer, a polyarylate resin, a polystyrene resin, and a polyamide resin in an amount of 0 to 55 wt %.

<Inorganic Compound (J)>

In order to improve the flexural rigidity and the dimensional stability of the injection molded foam, the polycarbonate resin composition may further contain an inorganic compound (J). As the inorganic compound, it may be possible to use at least one inorganic compound selected from the group consisting of mica, talc, montmorillonite, sericite, kaolin, glass flakes tabular alumina, synthetic hydrotalcite, wollastonite, hollow glass balloons, carbon fiber, aramid fiber, and whisker. From the viewpoint of the flexural rigidity improving effect and the dispersibility in the polycarbonate resin, it is more preferable to use at least one inorganic compound selected from the group consisting of mica, talc, montmorillonite, sericite, kaolin, glass flakes, hollow glass beads, and carbon fiber. From the viewpoint of the balance among impact resistance, fluidity and product appearance, it is even more preferable to use at least one inorganic compound selected from the group consisting of mica, talc, glass flakes, and wollastonite.

From the viewpoint of impact resistance, heat resistance, rigidity, moldability, and the like, the amount of the inorganic compound (J) contained in the polycarbonate resin composition may be 5 wt % or more and 45 wt % or less 5 wt % or more and 35 wt/o or less, or 5 wt % or more and 25 wt/o or less.

<Impact Modifier (K)>

In order to improve the impact resistance of the injection molded foam even more, the polycarbonate resin composition may further contain an impact modifier. As the impact modifier, it may be possible to use at least one compound selected from the group consisting of multistage graft polymers, polyolefin polymers, olefin-unsaturated carboxylic acid ester copolymers, and thermoplastic polyester elastomers.

The multistage graft polymers are polymers obtained by graft polymerization of a rubbery polymer with a vinyl monomer. As the rubbery polymer, it may be possible to use a rubbery polymer having a glass transition temperature of 0° C. or less, or −40° C. or less. Specific examples of such a rubbery polymer include diene rubbers, such as polybutadiene, a butadiene-styrene copolymer, a butadiene-acrylic acid ester copolymer, and a butadiene-acrylonitrile copolymer; acrylic rubbers, such as butyl polyacrylate, 2-ethylhexyl polyacrylate, a dimethyl siloxane-butyl acrylate rubber, and a silicone/butyl acrylate composite rubber; olefin rubbers, such as an ethylene-propylene copolymer and an ethylene-propylene-diene copolymer; dimethyl polysiloxane rubbers: dimethyl siloxane-diphenyl siloxane copolymer rubbers; and the like. Examples of the butadiene-acrylic acid ester copolymer include a butadiene-butyl acrylate copolymer and a butadiene-2-ethylhexyl acrylate copolymer. In terms of impact resistance, polybutadiene, a butadiene-styrene copolymer, and a butadiene-butyl acrylate copolymer may be used. Among butadiene-butyl acrylate copolymers, a copolymer composed of butyl acrylate in an amount of 50 to 70 wt % and butadiene in an amount of 30 to 50 wt % is preferable in terms of weather resistance and impact resistance. There is no particular limitation on the average particle size of the rubbery polymer as well, and it may be possible to use a rubbery polymer having an average particle size in a range of 0.05 µm or more and 2.00 µm or less, or 0.1 µm or more and 0.4 µm or less. Moreover, there is no particular limitation on the gel content as well, and it may be possible to use a rubbery polymer having a gel content in a range of 10 wt % or more and 99 wt % or less, or 80 wt % or more and 96 wt % or less.

Examples of the vinyl monomer used to produce the multistage graft polymer include an aromatic vinyl monomer, a vinyl cyanate monomer, a (meth)acrylic acid ester, and the like. These vinyl monomers may be used alone or in a combination of two or more. As each of the aromatic vinyl monomer, the vinyl cyanate monomer, and the (meth)acrylic acid ester, those listed above in the description of the acrylic resin particles (a) may be used as appropriate.

Specifically, it may be possible that the multistage graft polymer is composed of at least one rubbery polymer selected from the group consisting of polybutadiene, a butadiene-styrene copolymer, a butadiene-acrylic acid ester copolymer, and polyorganosiloxane in an amount of 10 to 90 wt %, as well as a graft component composed of a polymer obtained by polymerizing in the presence of the rubbery polymer, at least one vinyl monomer selected from the group consisting of an aromatic vinyl monomer, a vinyl cyanate monomer, and a (meth)acrylic acid ester compound in an amount of 10 to 90 wt %. It is particularly preferable to use a multistage graft polymer that is produced using an organophosphate emulsifier.

In the case where a core/shell graft polymer is prepared as the multistage graft polymer, it may be possible that the amount of the rubbery polymer is 10 wt % or more and 90 wt % or less and the amount of the vinyl monomer is 10 wt % or more and 90 wt % or less, where the total amount of the rubbery polymer and the vinyl monomer is 100 wt %, and it is more preferable that the amount of the rubbery polymer is 30 wt % or more and 85 wt % or less and the amount of the vinyl monomer is 15 wt % or more and 70 wt % or less. If the proportion of the rubbery polymer is less than 10 wt %, the impact resistance is likely to be reduced. On the other hand, if the proportion of the rubbery polymer is more than 90 wt %, the heat resistance tends to be reduced.

From the viewpoint of impact resistance, heat resistance, rigidity; moldability and the like, the amount of the impact modifier in the polycarbonate resin composition may be 0 to 20 wt %, 0 to 15 wt %, or 0 to 10 wt %.

The polycarbonate resin composition may also contain additives such as a flame retardant, an anti-UV agent, a stabilizer, a mold release, a pigment, a softener, a plasticizer, and a surfactant, as necessary.

<Injection Molded Foam>

An injection molded foam in which whitening is suppressed and which has a good appearance can be obtained through injection foaming of the polycarbonate resin composition. Specifically, the injection molded foam can be produced using a method for foaming the polycarbonate resin composition in a mold. There are various methods for foaming the polycarbonate resin composition in a mold, and among others, it may be possible to use a so-called core-back method (moving cavity method), in which a mold constituted by a fixed mold (also called a "cavity") and a movable mold (also called a "core") that can be moved forward and backward to any position is used, and, after injection of a resin composition to an initial fill thickness is completed, the resin composition is foamed by moving the movable mold backward. With the core-back method, a non-foamed layer is formed on the surface, and projections and depressions on the order of several micrometers to several tens of micrometers in the appearance are therefore smoothed. Also, a foamed layer inside is likely to have uniformly fine cells, and an injection molded foam having excellent lightweightness is likely to be obtained. For these reasons, the core-back method is preferable.

In the core-back method, the backward movement of the movable mold may be completed in one step or in two or more multiple steps, and the backward movement speed may also be adjusted as appropriate. For example, it may be possible that the core-back method includes a step of filling a mold by injecting the resin composition into the mold, the mold being constituted by a fixed mold and a movable mold that can be moved forward and backward to any position and having an initial cavity clearance to (initial fill thickness) of 1.5 mm or more and 2.7 mm or less, and a step of foaming the resin composition by moving the movable mold backward after the completion of the injection filling to the initial fill thickness such that a cavity clearance tr after the core-back operation becomes 2.0 mm or more and 6.0 mm or less.

In the core-back method, the other molding conditions can beset as follows: the temperature of the resin is 240° C. or more and 280° C. or less; the temperature of the mold is 60° C. or more and 90° C. or less; the molding cycle is 1 second or more and 60 seconds or less; the injection rate is 10 mm/second or more and 400 mm/second or less; the injection pressure is 10 MPa or more and 200 MPa or less; the back pressure is 5 MPa or more and 40 MPa or less; the screw rotation speed is 10 rpm or more and 200 rpm or less; and so on.

The injection molded foam can be suitably used for electrical appliances, such as cellular phones and housings of personal computers; members for vehicles, such as automobile fenders, door panels, back door panels, garnishes, pillars, and spoilers; and other uses.

From the viewpoint of weight reduction of the molded foam and impact strength thereof, it may be possible that the injection molded foam has a specific gravity of 0.3 g/cm$^3$ or more and 1.2 g/cm$^3$ or less. If the specific gravity of the injection molded foam is less than 0.3 g/cm$^3$ there is a tendency that the number of coarse cells larger than 1.5 mm increases, and the impact strength decreases accordingly. If the specific gravity is more than 1.2 g/cm$^3$, the weight reduction is unlikely to be achieved. The specific gravity can be calculated using a water displacement method in conformity with JIS K 7112:1999. From the viewpoint of weight reduction and impact strength, the expansion ratio of the injection molded foam may be 1.1 times or more and 3.0 times or less, 1.1 times or more and 2.5 times or less, or 1.1 times or more and 2.0 times or less. If the expansion ratio is less than 1.1 times there is a tendency that the lightweightness is unlikely to be obtained, and if the expansion ratio is more than 3.0 times, there is a tendency that the surface impact strength significantly decreases. Note that the "expansion ratio" as used herein means a value obtained by dividing the thickness (cavity clearance tr after core-back) of the injection molded foam by the initial cavity clearance $t_0$.

EXAMPLES

Hereinafter, one or more embodiments of the present invention will be described based on specific examples and comparative examples. However, one or more embodiments of the present invention are not limited to the examples below. In the following description, "part" means "part by weight", and "%" means "wt %", unless otherwise specified.

Various measurement methods and evaluation methods will be described below.

(1) Glass Transition Temperature

For the acrylic resin particles (a) (suspension polymer particles) and the carrier resin (B), the glass transition temperature was measured under the temperature increase conditions of 5° C./minute using a differential scanning calorimeter (DSC220C manufactured by Seiko Instruments & Electronics Ltd.).

(2) Vicat Softening Temperature

The Vicat softening temperature of the acrylic resin particles (b) (emulsion polymer particles) was measured based on the method A in JIS K 7206. A test specimen was prepared in the following manner: an emulsion polymer obtained by emulsion polymerization was collected through solidification, heat treatment, and drying, pelletized using an extrusion molding machine, and then formed into a sheet using a press forming machine.

(3) Average Particle Size

The average particle sizes of the acrylic resin particles (a), the acrylic resin particles (b), and the carrier resin (B1 were measured using a Microtrac MT-3300 manufactured by MicrotracBEL Corporation. The average particle size (in an unexpanded state) of the thermally expandable microcapsules (A) was measured using a particle size distribution measuring apparatus, SALD-3000J, manufactured by Shimadzu Corporation.

(4) Weight Average Molecular Weight

The weight average molecular weight of each resin was measured by GPC (gel permeation chromatography). Specifically a weight average molecular weight obtained in terms of polystyrene by performing measurement using an HLC-8220 system manufactured by Tosoh Corporation, two TSKgel SuperHZM-H columns manufactured by Tosoh Corporation, and THF as the solvent was used.

(5) Compatibility with Polycarbonate Resin (PC)

A mixture of the carrier resin composition (B) and the polycarbonate resin was subjected to differential scanning calorimetry (DSC), and whether or not the carrier resin composition (B) was compatible with PC was judged based on the following criteria.

Compatible: In DSC, the glass transition temperature had a single peak.

Incompatible: In DSC, the glass transition temperature had two peaks.

(6) Shear Viscosity

The shear viscosity of the carrier resin composition or the carrier resin at 80° C. was measured using a flow tester "model CFT-500C" manufactured by Shimadzu Corporation. Specifically, the measurement was started at a temperature of 50° C., and the carrier resin composition or the carrier resin was caused to flow through a 1.0-mm-diameter and 10-mm-long capillary under a constant load of 30 kgf. The temperature was increased at a rate of 10° C./min. and the shear viscosity at the point in time when the measurement temperature reached 80° C. was measured.

(7) Viscosity

The viscosity of the plasticizer (B2) at 25° C. was measured using an E-type viscometer in conformity with JIS Z 8803-1991.

(8) Maximum Expansion Temperature

"TMA measurement" was performed using a TMA-7 model manufactured by PerkinElmer. About 0.25 mg of a sample was placed in a container, and the temperature was increased at a temperature increase rate of 5° C./min. Changes in the height of the sample were continuously measured, and the temperature at the time when the largest change in the height of the sample in the container occurred was used as the maximum expansion temperature.

(9) Processability of Masterbatch

A cross section of a pellet of the masterbatch was observed under a scanning electron microscope (SEM, a "JSM-6060LA" model manufactured by JEOL Ltd.), and processability of the masterbatch was evaluated based on the state of thermally expandable microcapsules.

Good: Expansion of thermally expandable microcapsules was not observed.

Poor: Expansion of thermally expandable microcapsules was observed.

(10) Expansion Ratio of Injection Molded Foam

The expansion ratio was calculated by dividing the thickness (cavity clearance $t_f$ after core-back) of a flat plate-shaped injection molded foam by the cavity clearance $t_0$ of a corresponding portion of the mold in a clamping state.

(11) Appearance of Injection Molded Foam

The surface of a flat plate-shaped injection molded foam was visually observed, and the appearance was evaluated.

Good: No whitening was observed.

Somewhat good: Slight whitening was observed.

Poor: Significant whitening was observed.

Production Example 1 of Carrier Resin Particles (B)

<Production of Acrylic Resin Particles (a)>

First, 220 parts of deionized water and 15 parts of a 3% aqueous PVA solution (GH-20 manufactured by the Nippon Synthetic Chemical Industry Co., Ltd.) were fed into a reactor equipped with a stirrer, and the interior of the reactor was purged with nitrogen. Then, a monomer mixture of 25 parts of butyl acrylate in which 0.5 parts of lauroyl peroxide, 0.5 parts of benzoyl peroxide, and 0.2 parts of 2-ethylhexyl thioglycolate were dissolved and 75 parts of methyl methacrylate was added, and the rotation speed of the stirrer was adjusted such that the dispersed particle size of the monomer was about 250 µm. After that, the temperature was increased stepwise in such a manner that the temperature was kept at 60° C. for 2 hours, at 70° C. for 2 hours, at 80° C. for 2 hours, and at 90° C. for 1 hour, and polymerization was completed. Thus, a suspension of acrylic resin particles (a) in which the concentration of the acrylic resin particles (a)(solid component of the polymer) was 30%, the glass transition temperature thereof was 72° C., and the average particle size thereof was 150 µm was produced.

<Production of Acrylic Resin Particles (b)>

First, 220 parts of deionized water, 0.3 parts of boric acid, 0.03 parts of sodium carbonate, 0.09 parts of sodium N-lauroylsarcosinate, 0.09 parts of sodium formaldehyde sulfoxylate, 0.006 parts of sodium ethylenediamine tetraacetate, and 0.002 parts of ferrous sulfate heptahydrate were fed into a reactor equipped with a stirrer, the reactor was purged with nitrogen, and then, the temperature was increased to 80° C. Then, 25% of a monomer mixture composed of methyl methacrylate in an amount of 25 parts, allyl methacrylate in an amount of 0.1 parts, and t-butyl hydroperoxide in an amount of 0.1 parts was collectively fed into the reactor, and polymerization was performed for 45 minutes. Subsequently the remaining 75% of this mixed liquid was continuously added for 1 hour. After the addition was completed, the reaction system was kept at the same temperature for 2 hours, and polymerization was completed. Moreover, meanwhile, 0.2 parts by weight of sodium N-lauroylsarcosinate was added. In the thus obtained latex of an innermost layer cross-linked methacrylic polymer, the average particle size of polymer particles was 1,600 Å (obtained using light scattering at a wavelength of 546 nm), and the polymerization conversion rate (amount of polymer generated/amount of monomer fed×100) was 98%. Subsequently, the obtained latex of the innermost layer cross-linked methacrylic polymer was kept at 80° C. in a nitrogen gas stream, and 0.1 parts by weight of potassium persulfate was added. Then, a monomer mixed liquid containing n-butyl acrylate in an amount of 41 parts by weight, styrene in an amount of 9 parts by weight, and allyl methacrylate in an amount of 1 part by weight was continuously added for 5 hours. Meanwhile, 0.1 parts by weight of potassium oleate was added in three batches. After the completion of the addition of the monomer mixed liquid, in order to complete the polymerization, 0.05 parts by weight of potassium persulfate was further added, and the reaction system was kept for 2 hours. In the thus obtained emulsion polymerization latex, latex particles (b1) had an average particle size of 2,300 Å, and the polymerization conversion rate was 99%. Subsequently, the latex of the latex particles (b1) was kept at 80° C., and 0.02 parts by weight of potassium persulfate was added, and then, a mixed liquid of methyl methacrylate in an amount of 24 parts by weight, n-butyl acrylate in an amount of 1 part by weight, and t-dodecyl mercaptan in an amount of 0.1 parts by weight was continuously added for 1 hour. After the completion of the addition of the monomer mixed liquid, the reaction system was kept for 1 hour, and thus, a latex of an emulsion polymerization graft copolymer (acrylic resin particles (b)) having a multilayer structure, an average particle size of 0.25 µm, and a Vicat softening temperature of 90° C. was obtained.

<Production of Carrier Resin (B1)>

96 parts of the obtained latex of the acrylic resin particles (b)(30 parts of the solid component, that is, the acrylic resin particles (b)) and 332 parts of the suspension of the acrylic resin particles (a) (100 parts of the solid component, that is, the acrylic resin particles (a)) were mixed under stirring, and the obtained mixed suspension (the total concentration of the solid components, that is, the acrylic resin particles (a) and the acrylic resin particles (b) was 30%) was adjusted to a temperature of 60° C. Then. 50 parts of a 1.0% aqueous solution of calcium chloride was added dropwise for 10 minutes under stirring. After that, the temperature was increased to 95° C. under stirring to perform heat treatment, and thus, a carrier resin (B1-1) having an average particle size of 180 µm was obtained. The carrier resin (B1-1) had a weight average molecular weight of 280,000 and a glass transition temperature (Tg) of 77° C.

Production Example 2 of Carrier Resin (B1)

A carrier resin (B1-2) was produced using similar procedure to those of Production Example 1, except that the amount of 2-ethylhexyl thioglycolate was changed to 0.5 parts in the production of the acrylic resin particles (a). The obtained carrier resin (B1-2) had an average particle size of 200 µm, a weight average molecular weight of 60,000, and a glass transition temperature (Tg) of 77° C.

Production Example 3 of Carrier Resin (B1)

A carrier resin (B1-3) was produced using similar procedure to those of Production Example 1, except that the amount of 2-ethylhexyl thioglycolate was changed to 1.5 parts in the production of the acrylic resin particles (a). The obtained carrier resin (B1-3) had an average particle size of 190 µm, a weight average molecular weight of 20,000, and a glass transition temperature (Tg) of 77° C.

Production Example 4 of Carrier Resin (B1)

A carrier resin (B1-4) was produced using similar procedure to those of Production Example 1, except that the amount of 2-ethylhexyl thioglycolate was changed to 0.3 parts. The obtained carrier resin (B1-4) had an average particle size of 200 µm, a weight average molecular weight of 110,000, and a glass transition temperature (Tg) of 76° C.

Production Example 1 of Polyester-Polyether Copolymer

Polyethylene terephthalate (IV=0.65) produced using a germanium catalyst and a bisphenol A-ethylene oxide 30-mol adduct ("Bisol 30EN" manufactured by Toho Chemical Industry Co., Ltd., corresponding to a polyether unit represented by the general formula (6), where n+m=30), as well as germanium dioxide in a concentration of 400 ppm, and a stabilizer (Irganox 1010 manufactured by Ciba Specialty Chemicals) in a concentration of 2,000 ppm, with respect to the total amount of the polyethylene terephthalate and the bisphenol A-ethylene oxide 30-mol adduct, were fed into a reactor equipped with a stirrer and a gas discharge port, and kept at 270° C. for 2 hours. After that, the pressure was reduced using a vacuum pump, and polycondensation was performed at 1 torr. At the time when a predetermined degree of polymerization was reached, the pressure reduction was terminated to stop the reaction, and the product was taken out and, furthermore, cooled in a water tank to obtain a strand. The strand was post-crystallized and dried simultaneously in a hot-air dryer that was set to 100° C., and then placed into a mill and pelletized. Thus, a polyester-polyether copolymer (H2) in a pellet state was obtained. The obtained polyester-polyether copolymer (H2) had a polyether content of 30 wt % and an IV value of 0.45. Note that the IV values of the polyethylene terephthalate and the polyester-polyether copolymer were calculated from the logarithmic viscosity at 25° C. and 0.5 g/dl in a mixed solvent of tetrachloroethane/phenol=50/50 (weight ratio).

Example 1

<Production of Masterbatch of Thermally Expandable Microcapsules>

The carrier resin (B1-1) obtained as described above, an acrylic plasticizer (B2-1) ("ARUFON UP1020" manufactured by Toagosei Co., Ltd., having a weight average molecular weight of 2,000 and a viscosity of 500 mPa·s at 25° C., all acrylic, non-functional group) serving as the plasticizer (B2), and thermally expandable microcapsules (A) ("Microsphere S2640D" manufactured by Kureha Corporation, having an average particle size of 21 µm and a maximum expansion temperature of 249° C.) were mixed in weight proportions shown in Table 1 below. Then, the mixture was placed in a gravimetric feeder, supplied to a co-rotating, intermeshed twin-screw extruder (a 25-mm extruder manufactured by Technovel Corporation), and melt-kneaded at 130° C. to obtain a strand. The strand was cooled with water and then cut using a pelletizer. Thus, a masterbatch (C-1) of thermally expandable microcapsules in pellet form was obtained.

<Production of Polycarbonate Resin Composition>

50 parts of a polycarbonate resin ("S-2000" manufactured by Mitsubishi Chemical, having a number average molecular weight of 23,000), 15 parts of a thermoplastic polyester resin ("Bellpet EFG70" manufactured by Bell Polyester Products, Inc., polyethylene terephthalate), 15 parts of the polyester-polyether copolymer (H2) obtained as described above, and 15 parts of an inorganic compound (mica, "YM-21S" manufactured by Yamaguchi Mica Co., Ltd., having a number average particle size of 27 µm) were supplied to a co-rotating, intermeshed twin-screw extruder (TEX44 manufactured by the Japan Steel Works. Ltd.) and melt-kneaded at 280° C. to obtain a strand. The strand was cooled with water and then cut using a pelletizer. Thus, a polycarbonate resin composition serving as a base material component in pellet form was obtained. Then, 95 parts of the thus obtained polycarbonate resin composition serving as the base material component and 5 parts of the masterbatch (C-1) of the thermally expandable microcapsules (A) obtained as described above were hand-blended, to obtain a polycarbonate resin composition (I-1).

<Production of Injection Molded Foam>

An injection molded foam was produced through foam injection molding of the polycarbonate resin composition obtained as described above. Specifically, the polycarbonate resin composition (I-1) was supplied to an electric injection molding machine (manufactured by Toho Machinery & Metal Co., Ltd.) having a clamping force of 180 t and having a core-back function and a shut-off nozzle, and melt-kneaded at a cylinder temperature of 270° C. and a back pressure of 10 MPa. After that, a mold was filled by injecting the resin composition at an injection rate of 100 mm/second, the mold that was set to 60° C. being constituted by a fixed mold and a movable mold capable of moving forward and backward, and having a 160 mm long×160 mm wide flat plate-shaped cavity (having an initial cavity clearance to of 2.4 mm and a 8-mm-diameter direct gate at a center position of a bottom surface portion) shown in FIG. 1. After the completion of the injection filling to an initial fill thickness (initial cavity clearance to), the movable mold was moved backward such that the bottom surface portion had a desired thickness (expansion ratio)(such that the clearance, or the cavity clearance tr after core-back became 3.6 mm), and thereby the polycarbonate resin composition in the cavity was foamed. After the completion of foaming, the injection molded foam was cooled for 40 seconds and then taken out.

Example 2

A masterbatch (C-2) of thermally expandable microcapsules a polycarbonate resin composition (I-2), and an injection molded foam were produced using similar procedures to those of Example 1, except that the carrier resin (B1-2) was used instead of the carrier resin (B1-1).

Example 3

A masterbatch (C-3) of thermally expandable microcapsules, a polycarbonate resin composition (I-3), and an injection molded foam were produced using similar procedures to those of Example 1, except that the carrier resin (B1-2) was used instead of the carrier resin (B1-1), and the weight proportions of the carrier resin (B1-2) and the acrylic plasticizer (B2) were changed as shown in Table 1.

Example 4

A masterbatch (C-4) of thermally expandable microcapsules, a polycarbonate resin composition (I-4), and an injection molded foam were produced using similar procedures to those of Example 1, except that the carrier resin (B1-3) was used instead of the carrier resin (B1-1).

Example 5

A masterbatch (C-5) of thermally expandable microcapsules, a polycarbonate resin composition (I-5), and an injection molded foam were produced using similar procedures to those of Example 1, except that the carrier resin (B1-3) was used instead of the carrier resin (B1-1), and the weight proportions of the carrier resin (B1-3) and the acrylic plasticizer (B2) were changed as shown in Table 1.

Example 6

A masterbatch (C-6) of thermally expandable microcapsules, a polycarbonate resin composition (I-6), and an injection molded foam were produced using similar procedures to those of Example 5, except that an acrylic plasticizer (B2-2) ("ARUFON UP1500" manufactured by Toagosei Co., Ltd., having a weight average molecular weight of 12,000 and a viscosity of 80,000 mPa·s at 25° C., styrene/acrylic, non-functional group) was used as the plasticizer.

Example 7

A masterbatch (C-7) of thermally expandable microcapsules, a polycarbonate resin composition (I-7), and an injection molded foam were produced using similar procedures to those of Example 6, except that the carrier resin (B1-4) was used instead of the carrier resin (B1-3).

Comparative Example 1

A masterbatch of thermally expandable microcapsules, a polycarbonate resin composition, and an injection molded foam were produced using similar procedures to those of Example 1, except that the weight proportion of the carrier resin (B1-1) was changed as shown in Table 1, and the acrylic plasticizer (B2) was not used.

Comparative Example 2

A masterbatch of thermally expandable microcapsules, a polycarbonate resin composition, and an injection molded foam were produced using similar procedures to those of Comparative Example 1, except that an acrylic processing aid ("Kane Ace PA60" manufactured by Kaneka Corporation, having a weight average molecular weight of 5,000,000) was used instead of the carrier resin (B1-1).

The processability of the masterbatches of the examples and the comparative examples was evaluated in the above-described manner. Table 1 below shows the results. Also, the appearance of the injection molded foams of the examples and the comparative examples was evaluated in the above-described manner. Table 1 below shows the results. Table 1 also shows the expansion ratio.

polycarbonate resin compositions using the masterbatches, and the appearance was good.

On the other hand, in Comparative Example 1, in which the acrylic plasticizer (B2) having a weight average molecular weight of 1,000 or more and 20,000 or less was not used, but an acrylic resin that was substantially compatible with a polycarbonate resin but had a shear viscosity of more than $1.5 \times 10^6$ Pa·s at 80° C. was used, the processability of the masterbatch of the thermally expandable microcapsules was poor, and significant whitening occurred on the surface of the injection molded foam obtained through foam injection molding of the polycarbonate resin composition using the masterbatch, and the appearance was poor. Meanwhile, in the Comparative Example 2 as well, in which the acrylic plasticizer (B2) having a weight average molecular weight of 1,000 or more and 20.000 or less was not used, but an acrylic resin that was not substantially compatible with a polycarbonate resin and had a shear viscosity of more than $1.5 \times 10^6$ Pa·s was used, the processability of the masterbatch of the thermally expandable microcapsules was poor, and significant whitening occurred on the surface of the injection molded foam obtained through foam injection molding of the polycarbonate resin composition using the masterbatch, and the appearance was poor.

TABLE 1

| | | Examples | | | | | | | Comparative Examples | |
|---|---|---|---|---|---|---|---|---|---|---|
| | | 1 | 2 | 3 | 4 | 5 | 6 | 7 | 1 | 2 |
| Composition of masterbatch (part) | Carrier resin (B1-1) | 48 | | | | | | | 60 | |
| | Carrier resin (B1-2) | | 48 | 42 | | | | | | |
| | Carrier resin (B1-3) | | | | 48 | 42 | 42 | | | |
| | Carrier resin (B1-4) | | | | | | | 42 | | |
| | Acrylic plasticizer (B2-1) | 12 | 12 | 18 | 12 | 18 | | | | |
| | Acrylic plasticizer (B2-2) | | | | | | 18 | 18 | | |
| | Acrylic processing aid | | | | | | | | | 60 |
| | Thermally expandable microcapsules | 40 | 40 | 40 | 40 | 40 | 40 | 40 | 40 | 40 |
| Compatibility of carrier resin composition or carrier resin with PC | | Compatible | Compatible | Compatible | Compatible | Compatible | Compatible | Compatible | Compatible | Incompatible |
| Shear viscosity of carrier resin composition or carrier resin at 80° C. (×10⁴ Pa·s) | | 130 | 60 | 5.0 | 30 | 2.4 | 6.0 | 70 | N/A | N/A |
| Processability of masterbatch | | Good | Good | Good | Good | Good | Good | Good | Poor | Poor |
| Expansion ratio (times) of injection molded foam | | 1.5 | 1.5 | 1.5 | 1.5 | 1.5 | 1.5 | 1.5 | 1.5 | 1.5 |
| Appearance of injection molded foam | | Good | Good | Good | Good | Good | Good | Good | Poor | Poor |

As can be seen from Table 1 above, in the examples in which the carrier resin composition (B) was used, the carrier resin composition (B) containing the carrier resin (B), which was an acrylic resin having a weight average molecular weight of 8,000 or more and 350,000 or less, and the acrylic plasticizer (B2), which had a weight average molecular weight of 1,000 or more and 20,000 or less, being substantially compatible with a polycarbonate resin, and having a shear viscosity of 1.0 Pa·s or more and $1.5 \times 10^6$ Pa·s or less at 80° C., the processability of the masterbatches of the thermally expandable microcapsules was good. Also, whitening did not occur on the surface of the injection molded foams obtained through foam injection molding of the Although the disclosure has been described with respect to only a limited number of embodiments, those skilled in the art, having benefit of this disclosure, will appreciate that various other embodiments may be devised without departing from the scope of the present invention. Accordingly, the scope of the invention should be limited only by the attached claims.

The invention claimed is:
1. A masterbatch (C) comprising:
thermally expandable microcapsules (A); and
a carrier resin composition (B), wherein the carrier resin composition (B) contains a carrier resin (B1) and a plasticizer (B2), the carrier resin (B1) being an acrylic resin having a weight average molecular weight of 8,000 or more and 350,000 or less and being a solid at 20° C., and the plasticizer (B2) being a liquid at 20° C. and having a weight average molecular weight of 1,000 or more and 20,000 or less, and wherein the carrier resin composition (B) is substantially compatible with a polycarbonate resin and has a shear viscosity of 1.0 Pa·s or more and $1.5 \times 10^6$ Pa·s or less at 80° C.

2. The masterbatch according to claim 1, wherein the masterbatch (C) is used for the polycarbonate resin.

3. The masterbatch according to claim 1, wherein the polycarbonate resin further comprises at least one other thermoplastic resin selected from the group consisting of a polyester resin, a polyester-polyether copolymer, an acrylonitrile-butadiene-styrene copolymer, an acrylonitrile-ethylene-propylene-diene-styrene copolymer, an acrylate-styrene-acrylonitrile copolymer, an acrylonitrile-styrene copolymer, a polyarylate resin, a polystyrene resin, and a polyamide resin.

4. The masterbatch according to claim 1, wherein the plasticizer (B2) is an acrylic plasticizer.

5. The masterbatch according to claim 1, wherein the carrier resin (B1) has a glass transition temperature (Tg) of −30° C. or more and 150° C. or less.

6. The masterbatch according to claim 1,
wherein the thermally expandable microcapsules (A) have a core-shell structure and are constituted by a core comprising at least one compound having a boiling point of 10° C. or more and 330° C. or less, and a shell that encloses the core, and wherein the shell comprises a resin having a constitutional unit derived from at least one monomer selected from the group consisting of a nitrile monomer, a (meth)acrylate monomer, an aromatic vinyl monomer, a diene monomer, a vinyl monomer having a carboxyl group, and a monomer having at least one reactive functional group selected from the group consisting of a methylol group, a hydroxyl group, an amino group, an epoxy group, and an isocyanate group.

7. The masterbatch according to claim 1, wherein the thermally expandable microcapsules (A) have a maximum expansion temperature of 180° C. or more and 300° C. or less.

8. The masterbatch according to claim 6, wherein, in the resin forming the shell, a constitutional unit derived from at least one monomer selected from the group consisting of a monomer containing a carboxyl group and a monomer containing an amino group is contained in a concentration of 12 mmol/g or less.

9. The masterbatch according to claim 1, wherein the thermally expandable microcapsules (A) have an average particle size of 0.5 μm or more and 50 μm or less.

10. The masterbatch according to claim 1, wherein the carrier resin (B1) is an acrylic resin comprising acrylic resin particles (a) having an average particle size of 50 μm or more and 500 μm or less and acrylic resin particles (b) having an average particle size of 0.05 μm or more and 0.5 μm or less, and wherein the acrylic resin particles (a) are coated with the acrylic resin particles (b).

11. The masterbatch according to claim 10, wherein the acrylic resin particles (a) comprise a (meth)acrylic acid ester in an amount of 30 to 100 wt % and a vinyl monomer copolymerizable with the (meth)acrylic acid ester in an amount of 0 to 70 wt %.

12. The masterbatch according to claim 10, wherein the acrylic resin particles (b) comprise a (meth)acrylic acid ester in an amount of 30 to 100 wt % and a vinyl monomer copolymerizable with the (meth)acrylic acid ester in an amount of 0 to 70 wt %.

13. The masterbatch according to claim 10, wherein the acrylic resin particles (b) are polymer particles obtained by polymerization of 50 to 90 parts by weight of latex particles (b1) comprising a (meth)acrylic acid ester in an amount of 50 to 100 wt %, an aromatic vinyl monomer in an amount of 0 to 40 wt %, a vinyl monomer copolymerizable with the (meth)acrylic acid ester and the aromatic vinyl monomer in an amount of 0 to 10 wt %, and a multifunctional monomer in an amount of 0 to 5 wt % with 10 to 50 parts by weight of a monomer mixture (b2) comprising a (meth)acrylic acid ester in an amount of 10 to 100 wt %, an aromatic vinyl monomer in an amount of 0 to 90 wt %, a vinyl cyanate monomer in an amount of 0 to 25 wt %, and a vinyl monomer copolymerizable with the (meth)acrylic acid ester, the aromatic vinyl monomer, and the vinyl cyanate monomer in an amount of 0 to 20 wt %, and a total amount of the latex particles (b1) and the monomer mixture (b2) is 100 parts by weight.

14. The masterbatch according to claim 1, wherein the masterbatch (C) comprises the thermally expandable microcapsules (A) in an amount of 30 wt % or more and 80 wt % or less, the carrier resin (B1) in an amount of 15 wt % or more and 65 wt % or less, and the plasticizer (B2) in an amount of 5 wt/o or more and 30 wt/o or less, and the amount of the carrier resin (B1) is larger than the amount of the plasticizer (B2).

15. A polycarbonate resin composition comprising:
the masterbatch according to claim 1 in an amount of 1 to 15 wt %, a polycarbonate resin in an amount of 30 to 99 wt %, and at least one other thermoplastic resin selected from the group consisting of a polyester resin, a polyester-polyether copolymer, an acrylonitrile-butadiene-styrene copolymer, an acrylonitrile-ethylene-propylene-diene-styrene copolymer an acrylate-styrene-acrylonitrile copolymer, an acrylonitrile-styrene copolymer, a polyarylate resin, a polystyrene resin, and a polyamide resin in an amount of 0 to 55 wt %.

16. The polycarbonate resin composition according to claim 15, further comprising an inorganic compound.

17. An injection molded foam that is obtained through foam injection molding of the polycarbonate resin composition according to claim 15.

18. A method for producing an injection molded foam, the method comprising:
supplying the polycarbonate resin composition according to claim 15 to an injection molding machine; and
moving a core of a mold backward after filling to an initial fill thickness has been completed.

* * * * *